US012261733B2

(12) United States Patent
Deshmukh et al.

(10) Patent No.: US 12,261,733 B2
(45) Date of Patent: Mar. 25, 2025

(54) INCIDENT MANAGEMENT ENGINE FOR AN INCIDENT MANAGEMENT SYSTEM

(71) Applicant: MICROSOFT TECHNOLOGY LICENSING, LLC, Redmond, WA (US)

(72) Inventors: Shantanu Uddhav Deshmukh, Renton, WA (US); Prasanna Kumar Padmanabhan, Bellevue, WA (US); Gregory C J Chang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/162,613

(22) Filed: Jan. 31, 2023

(65) Prior Publication Data

US 2024/0259251 A1 Aug. 1, 2024

(51) Int. Cl.
*H04L 41/0604* (2022.01)
*H04L 41/0681* (2022.01)
*H04L 43/062* (2022.01)

(52) U.S. Cl.
CPC ...... *H04L 41/0609* (2013.01); *H04L 41/0681* (2013.01); *H04L 43/062* (2013.01)

(58) Field of Classification Search
CPC ............ H04L 41/0609; H04L 41/0681; H04L 43/062
See application file for complete search history.

(56) References Cited

U.S. PATENT DOCUMENTS

| 6,606,316 B1* | 8/2003 | Albert ............... H04L 47/10 370/389 |
| 10,644,954 B1* | 5/2020 | Pinos .................. H04L 43/062 |
| 11,303,562 B1* | 4/2022 | Liu ..................... H04L 43/0882 |

(Continued)

OTHER PUBLICATIONS

Anonymous: "Make all things redundant-Azure Application Architecture Guide: Microsoft Learn", Jun. 5, 2022, pp. 1-3.

(Continued)

*Primary Examiner* — Joseph L Greene
(74) *Attorney, Agent, or Firm* — Shook, Hardy & Bacon L.L.P.

(57) ABSTRACT

A resilient incident management system is provided that continues operation when certain outages occur. An RSS feed is utilized to indicate incident-related information despite the certain outages. In an embodiment, the incident management system includes a redundant architecture that comprises a traffic manager and a backup traffic manager. The incident management system receives a client request for incident-related information and determines a priority level or a performance level of end points associated with the request. Based on a status of the traffic manager and the backup traffic manager, as well as based on the priority level or the performance level, the incident management system causes a computer operation to be executed via the redundant architecture to retrieve a response from a producer and generate the RSS feed. In this manner, incident-related information is provided to the client even when the components responsible for providing the incident-related information themselves experience outages.

20 Claims, 11 Drawing Sheets

(56) References Cited

U.S. PATENT DOCUMENTS

| | | | |
|---|---|---|---|
| 2002/0176131 A1* | 11/2002 | Walters | H04J 14/0295 |
| | | | 398/58 |
| 2014/0172842 A1* | 6/2014 | Sumanth | H04L 43/08 |
| | | | 707/723 |
| 2015/0347246 A1* | 12/2015 | Matsui | G06F 3/0653 |
| | | | 714/4.12 |
| 2017/0046374 A1* | 2/2017 | Fletcher | G06F 9/542 |
| 2019/0149396 A1* | 5/2019 | Zafer | H04L 41/0654 |
| | | | 709/224 |
| 2021/0157694 A1* | 5/2021 | Dye | G06F 11/142 |

OTHER PUBLICATIONS

Berman Daniel: "The Complete Guide to Azure Monitoring I Logz.io", Dec. 26, 2022, pp. 1-21.

International Search Report and Written Opinion received for PCT Application No. PCT/US2024/010379, Apr. 4, 2024, 18 pages.

Lindsay Greg: "acrolinx .MicrosoftDocs/azure-docs@9d3e813. GitHub", Nov. 30, 2022, pp. 1-2.

Lindsay Greg: "azure-docs/articles/traffic-manager/traffic-manager-routing-methods.md at b1792083fa688a4623f6337b100cc97bd27e6849 .MicrosoftDocs/azure-docs. GitHub", Nov. 11, 2022, pp. 1-12.

Lindsay Greg: "remove default mentions .MicrosoftDocs/azure-docs@b179208. GitHub", Nov. 11, 2022, pp. 1-2.

* cited by examiner

INCIDENT MANAGEMENT ENGINE FOR AN INCIDENT MANAGEMENT SYSTEM

BACKGROUND

Certain users rely on applications and services to facilitate management of cloud computing resources and access to data repositories, such as a database. Cloud computing platforms and other distributed computing systems, typically host information management systems that support network access to the data repositories. Certain information management systems include an incident management system that provides various incident management tools responsive to certain user queries and requests. The incident management system can operate as part of the information management system to provide cloud alerts, a personalized dashboard providing information associated with computing resource health, and tools for monitoring the impact of various cloud computing services. In some implementations, the incident management system performs computing tasks to provide users with an overview of their cloud computing resources. For example, incident management systems generally support computer operations including servicing a request to provide to a user information about the status of their cloud computing resources associated with the user.

SUMMARY

Various aspects of the technology described herein are generally directed to systems, methods, and computer storage media for, among other things, providing an improved incident management system that is made resilient by failsafe computing infrastructure and logic so as to enable its continued operation to provide incident-related information when certain outages occur within the incident management system. The improved incident management system utilizes a Really Simply Syndication (RSS) feed indicative of incident-related information requested by a client. By employing the embodiments disclosed herein, the RSS feed indicative of the incident-related information is provided despite certain outages of components of the incident management system generally responsible for processing a portion of the request. The incident-related information can include data related to normal operating parameters of computing resources associated with a user, as well as data related to events that are not part of the normal operations (such as outages) of the computing resources that can disrupt the normal operating parameters. In an embodiment, the incident-related information is populated on the RSS feed that is personalized for the user despite certain outages within the incident management system.

Operationally, certain embodiments of the improved incident management system disclosed herein include at least one traffic manager and at least one backup traffic manager arranged in parallel. The traffic manager and/or the backup traffic manager employ any suitable protocol, such as Domain Name System (DNS), to direct or route client requests to appropriate end points based on a traffic-routing method. In one example, the at least one traffic manager includes (1) a priority traffic manager configured to process requests based on a traffic-routing method indicative of a priority level of the end points associated with the requests and (2) a performance traffic manager configured to process the requests based on a traffic-routing method indicative of a corresponding performance level. In one example, the backup traffic manager includes (1) a backup priority traffic manager serving as a backup for the priority traffic manager and configured to process the requests based on the corresponding priority level of the end points associated with the request, as well as (2) a backup performance traffic manager comprising a content delivery network (CDN) and serving as a backup for the priority traffic manager.

The incident management system operates to access, via an incident management engine, a request for incident-related information associated with the user. Certain embodiments of the incident management system determine a priority level or a performance level of the end points associated with the associated with the request. Additionally or alternatively, the incident management system determines a status of the least one traffic manager and a backup status of the at least one backup traffic manager. In an embodiment, based on the status, the backup status, and at least one of: the priority level or the performance level, the incident management system causes a computer operation associated with the request to be executed against an incident data structure managed by a producer. At least a portion of the computer operation is executed via a traffic manager (such as a priority traffic manager, a performance traffic manager, or a combination of these) or a backup traffic manager (such as a backup priority traffic manager, a backup performance traffic manager, or a combination of these). In response to executing the computer operation, the incident management system receives a response from the producer to generate an RSS feed indicative of the incident-related information associated with the user.

In this manner, requests for incident-related information can be processed to generate, without interruption, the RSS feed regardless of whether the priority traffic manager, the performance traffic manager, the backup priority traffic manager, the backup performance traffic manager, and/or other components experience an outage. For example, if the priority traffic manager experiences an outage, the backup priority traffic manager can process the request, thereby providing the user an uninterrupted, continuous RSS feed. Accordingly, the need for immediate manual intervention to service the component in the case of a component failure is reduced or altogether omitted because other components of the disclosed incident management system are able to automatically process the request. Additionally, the latency associated with servicing multiple requests is reduced based on the at least one backup traffic manager and the at least one traffic manager processing different requests, instead of one traffic manager processing each request. As a result, embodiments disclosed herein improve computational efficiency, facilitate scaling, and enhance user experiences associated with management of cloud computing resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
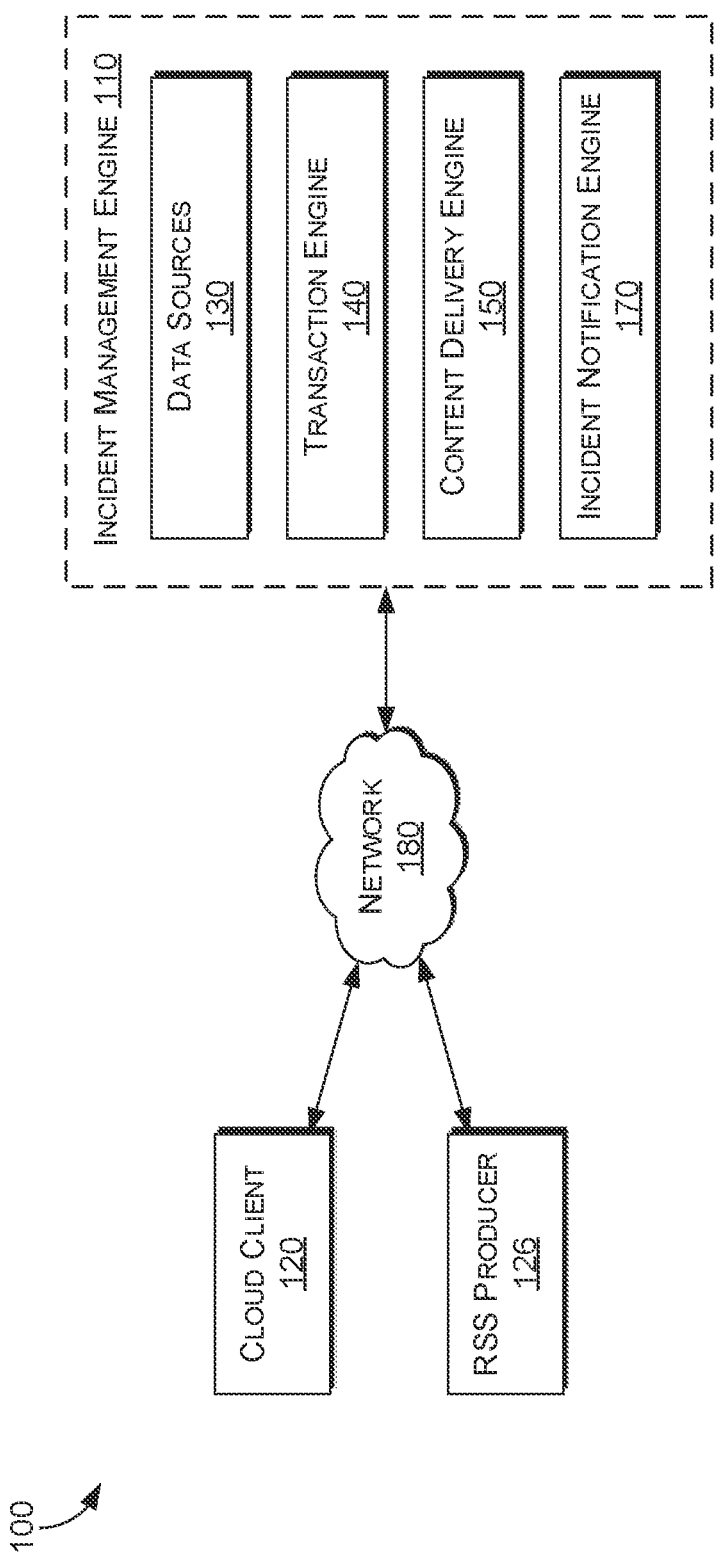
FIG. 1A is a block diagram of an example incident management system for generating an RSS feed regardless of an outage within the incident management system, in accordance with aspects of the technology described herein.

Overview of Technical Problems, Technical Solutions, and Technological Improvements Incident management systems operate within an information management system to provide cloud alerts, a personalized dashboard providing information associated with computing resource health, and tools for servicing requests and monitoring the impact of cloud computing services. For example, incident management systems perform computing tasks to provide users with an overview of their cloud computing resources, including incident-related information affecting these cloud computing resources. Conventionally, certain incident management systems are not configured with computing infrastructure and logic to support providing uninterrupted incident-related information when certain outages occur within the incident management system.

In more detail, certain existing incident management systems are implemented with architectural dependencies defining a single path for communicating the client request and response, such that the components of the incident management system are sequentially arranged along the single path to process the client request and return a response. As a result of the components being arranged along the single path, a failure in any one of the components causes the conventional incident management system to fail to respond to the client request for incident-related information. As such, a more comprehensive incident management system—with a fail-safe alternative for continuing to provide information about the status of the user's resources when certain outages occur within the incident management system—can improve computing operations and interfaces in incident management systems.

As used herein in one example, a "request," "user request," or "client request" for incident-related information refers to a client-side call for data associated with the client's computing resources. Example client-side calls include a Domain Name System (DNS) call, a user datagram protocol (UDP) call, or a Transmission Control Protocol (TCP), to name a few. The request for incident-related information may be received from a user as a selection (for example, checkbox selection, drop-down menu selection, and so froth) on a graphical user interface or as any suitable input (for example, text comprising alphanumeric characters, a voice input, and the like). In one example, "incident-related information" refers to any suitable information or tools associated with a client's cloud computing resources including information related to normal operating parameters of those cloud computing resources, as well as data related to events that are not part of the normal operations of the cloud computing resources that can disrupt the normal operating parameters. As used herein in one example, to "process," "handle," or "service" the request means to execute at least a portion of a computer operation associated with the request to facilitate outputting a response associated with the request. In some embodiments, a component is able to "process," "handle," or "service" a request when the component is active and running within a system. For example, unresponsive components or components experiencing certain outages are unable to "process," "handle," or "service" the request.

As used herein in one example, a "Really Simply Syndication feed" or "RSS feed" refers to a web feed that allows applications to access updates to websites in a standardized, computer-readable format, such as by using a generic extended markup language (XML) file containing XML data. For example, an RSS reader assembles, in a single news aggregator, information (such as incident-related information) from many different websites managed by different service providers. In some embodiments, the RSS reader automatically checks for content uploaded by a producer of interest to a user, allowing the content to automatically pass from that site into the RSS feed, for example, through a process known as "web syndication." An RSS reader populates the RSS feed with information published by a producer. A "publisher" or "producer," as used herein in one example, refers to an entity that owns or hosts content made accessible to clients. For example, a producer could own the domain, but use a hosting service (or own the hosting service used) to host their content that is communicated to clients via an RSS-based channel supporting an RSS format, such as the RSS 2.0 format.

Although certain embodiments disclosed herein are discussed in the context of an RSS feed, it should be understood that aspects of this disclosure can be implemented in association with any suitable information feed, such as an email news feed sending communications to subscribers, an Atom Syndication Format employing an Atom Publishing protocol, a social media feed, or any other feed using an XML-based or JavaScript Object Notation (JSON)-based format.

Some conventional incident management systems call upon a producer to return an XML response to a request for incident-related content. However, conventional incident management systems include architectural dependencies between the components used to process the request. For example, certain conventional incident management systems include a series of sequentially arranged components, such that an outage in any of the components causes the conventional incident management system to be unable to process, translate, or communicate the request to the producer. The sequentially arranged components may include a traffic manager connected in series to another traffic manager that communicates the request to an application-level gateway (ALG) that pulls data from an upstream producer. Under this architectural arrangement, an outage in any one component (for example, the traffic manager, the other traffic manager, or the ALG) causes the request for incident-related information to fail to return an output to the query at least due to the component experiencing the outage being unable to process a portion of the request. Due to this architectural dependency, certain RSS feeds fail to provide incident-related information, such as certain outages, which defeats the purpose of an RSS feed for communicating incident-related information.

Indeed, conventional incident management systems are typically implemented with certain architectural dependencies that prevent certain incident-related information from being surfaced or that altogether fail to process the request for incident-related information. The conventional incident management system fails to include a fail-safe, redundant architecture that continuously provides incident-related information about the status of the user's resources when certain outages occur within the incident management system, even when the components responsible for servicing the request and generating the RSS feed experience an outage. Moreover, even when all components of these conventional incident management systems are functioning properly, generating the RSS feed includes high latency due to the architectural dependencies of certain conventional incident management systems.

One approach for facilitating the continuous population of the RSS feed with incident-related information includes dedicating information-technology (IT) specialists to each component of the sequentially arranged components. These dedicated IT specialists may be burdened with quickly responding to the outage and manually remedying the issue causing the outage. Additionally, these dedicated IT specialists fail to address the high latency issues associated with the conventional incident management systems. Moreover, this manual process of identifying the issue causing the outage can be burdensome, inefficient, and still fails to provide the incident-related information while the issue is being resolved. In contrast to existing approaches, embodiments of the present disclosure provide the incident-related information during a component outage and even while the component experiencing the outage (1) is responsible for serving the client request for incident-related information and (2) is being diagnosed and resolved. Moreover, certain aspects of the present disclosure reduce CPU cycles and reduce network latency by distributing computational workloads for handling the client request across the incident management system components.

With this in mind, embodiments of the present disclosure provide, generate, and update an RSS feed indicative of the incident-related information associated with the client. The RSS feed is a web feed that allows applications to access updates to websites in a standardized, computer-readable format, such as by using a generic extended markup language (XML) file. The incident-related information includes data related to normal operating parameters of computing resources associated with a user, as well as data related to events that are not part of the normal operations of the computing resources that can disrupt the normal operating parameters. The incident-related information is populated on the RSS feed that is personalized for the user despite certain outages within the incident management system.

Operationally, the improved incident management system disclosed herein includes at least one traffic manager and at least one backup traffic manager. The traffic manager and/or the backup traffic manager employ any suitable protocol to direct client requests to appropriate end points based on a traffic-routing method. In one example, the at least one traffic manager includes (1) a priority traffic manager configured to process requests based on a traffic-routing method indicative of a priority level of the end points associated with the requests and (2) a performance traffic manager configured to process the requests based on a traffic-routing method indicative of a corresponding performance level of the end points associated with the request. In one example, the backup traffic manager includes (1) a backup priority traffic manager serving as a backup for the priority traffic manager and configured to process the requests based on the corresponding priority level of the end points associated with the request, as well as (2) a backup performance traffic manager comprising a content delivery network (CDN) and serving as a backup for the performance traffic manager.

As used herein in one example, "end points" refers to downstream devices or architecture components that perform or complete at least one subsequent portion of a computer operation. For example, as discussed with respect to FIG. 3, a request is received and directed through various devices, and the end points of one device are the downstream devices configured to handle the subsequent request. In one embodiment, the priority level or the performance level of these end points are determined, and used to direct the request, as discussed herein.

In some embodiments, the incident management system operates to access, via an incident management engine, a client request for incident-related information associated with the user. In one embodiment, the incident management system determines a priority level or a performance level associated with the end points associated with the request. Additionally or alternatively, the incident management system determines a status of the traffic manager and a backup status of the backup traffic manager. Based on the status, the backup status, and at least one of: the priority level or the performance level; in one embodiment, the incident management system causes a computer operation associated with the request to be executed against an incident data structure managed by a producer.

By way of a non-limiting example, suppose the incident management system includes two traffic managers, namely, a priority traffic manager and a performance traffic manager. Additionally, suppose the incident management system includes two backup traffic managers, namely, a backup priority traffic manager and a backup performance traffic manager. In one embodiment, the incident management system receives client requests and distributes those requests across multiple active devices, such as the priority traffic manager and the backup traffic manager. The priority level or performance level of end points is determined and used to direct the request in a manner that increases speed and/or reduces computational resources. In this manner, latency is reduced since the priority traffic manager and the backup traffic manager share computational workloads associated with servicing the client requests, for example, based on a priority level associated with the end points associated with the request.

When the priority traffic manager experiences an outage preventing it from servicing the client request, the backup priority traffic manager can process the requests that were originally designated for the priority traffic manager. Similarly, when the backup priority traffic manager experiences an outage preventing it from servicing the client request, the priority traffic manager can process the requests that were originally designated for the backup priority traffic manager. In this manner, the requests can be directed to the next component for servicing the request even when components that would otherwise direct the request experience outages.

Continuing this example, the request is communicated from the priority traffic manager or the backup priority traffic manager to a CDN that further directs the request to an appropriate end point. For example, the CDN directs the request to a performance traffic manager or to a backup performance traffic manager based on the performance level associated with end points (or downstream devices or architectural components) relative to the CDN. For example, an end point having a higher performance is the next component to process the request, instead of another available end point having a lower performance level. However, when a first end point has a performance level indicating that it is experiencing an outage preventing it from servicing the client request, a second end point can process the requests that were originally designated for the first end point.

In one example, the performance traffic manager processing the request includes directing the request, based on the performance level of end points, to an application-level gateway (ALG) to cause the response from the producer to be pulled from a regional instance. In one example, the backup performance traffic manager directing the request, based on the performance level of end points, to the ALG (similar to the performance traffic manager) or routing the request to a backup storage device to which the producer pushes or writes XML data used to generate and update the RSS feed for a client. Accordingly, the RSS feed can be populated with incident-related information regardless of outages in the incident management system.

In this manner, requests for incident-related information are serviced without interruption to generate the RSS feed regardless of whether the priority traffic manager, the performance traffic manager, the backup priority traffic manager, and/or the backup performance traffic manager experience an outage. For example, if the priority traffic manager experiences an outage, the backup priority traffic manager can process the request, thereby providing the user an uninterrupted, continuous RSS feed. Accordingly, the need for manual intervention in the case of a component failure is reduced or altogether omitted because other components of the disclosed incident management system are able to automatically process the request. Additionally, the latency associated with servicing the requests is reduced based on the backup traffic manager and the traffic manager each processing different requests, instead of one traffic manager processing each request. As a result, embodiments disclosed herein improve computational efficiency, facilitate scaling, and enhance user experiences associated with management of cloud computing resources.

Additionally, embodiments of the present disclosure improve the continuous generation of the RSS feed with incident-related information requested by a client despite outages within the incident management system. Indeed, not only does the incident management system continue to generate the RSS feed; the incident management system can inform a client of the outage within the incident management system, which corresponds to data that is unable to be surfaced used certain existing incident management systems. Additionally, embodiments of the present disclosure reduce latency because computational expenses associated with handling client request are distributed across devices responsible for processing that portion of the request. Moreover, graphical user interfaces and user experiences are improved by employing embodiments of the present disclosure because clients can have uninterrupted access to their RSS feed to continue to stay updated on the status of their computational resources within a distributed system.

Figure 1B:
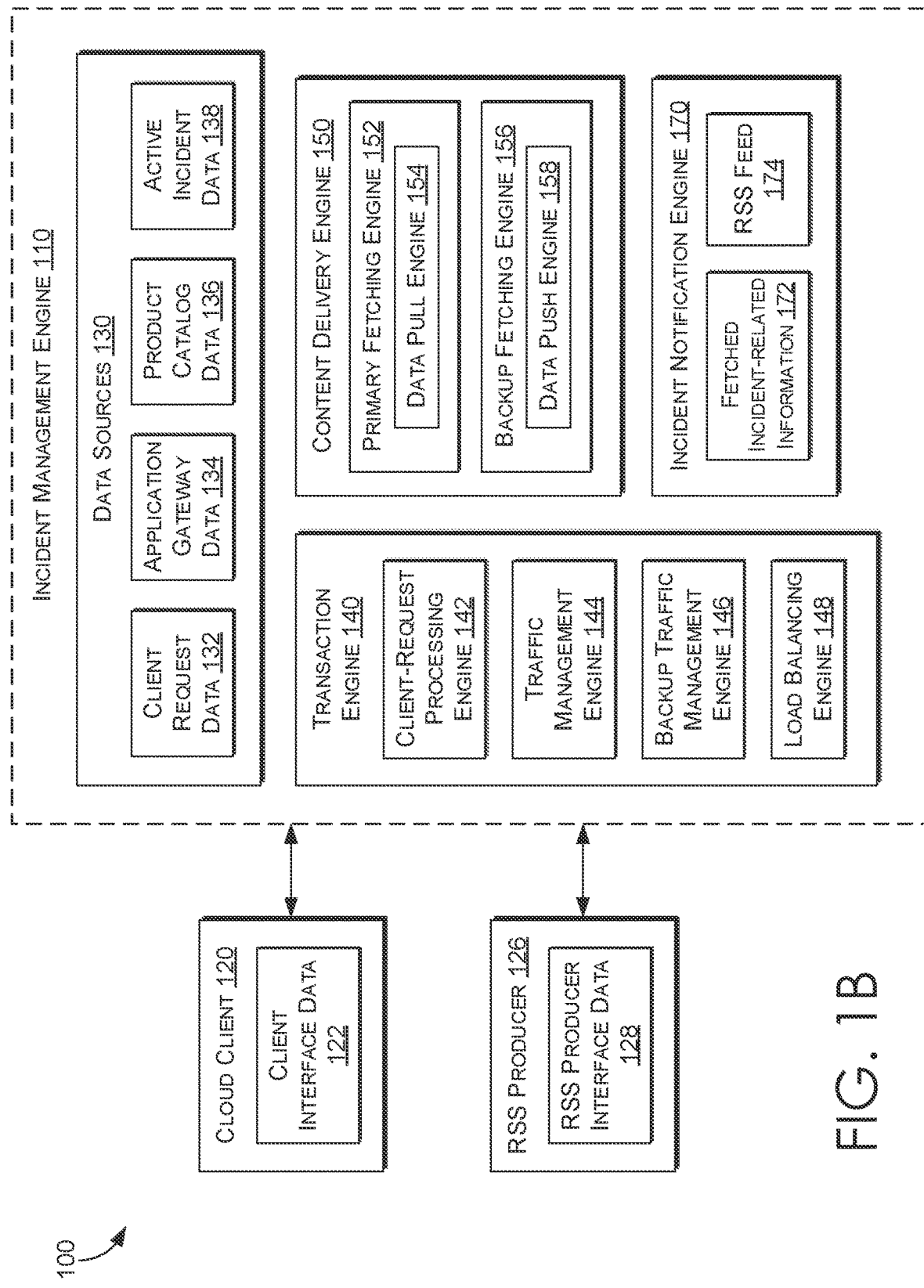
FIG. 1B is a block diagram of an example schematic for generating, by using an incident management engine in an incident management system, an RSS feed regardless of an outage within the incident management system, in accordance with aspects of the technology described herein.
Figure 1C:
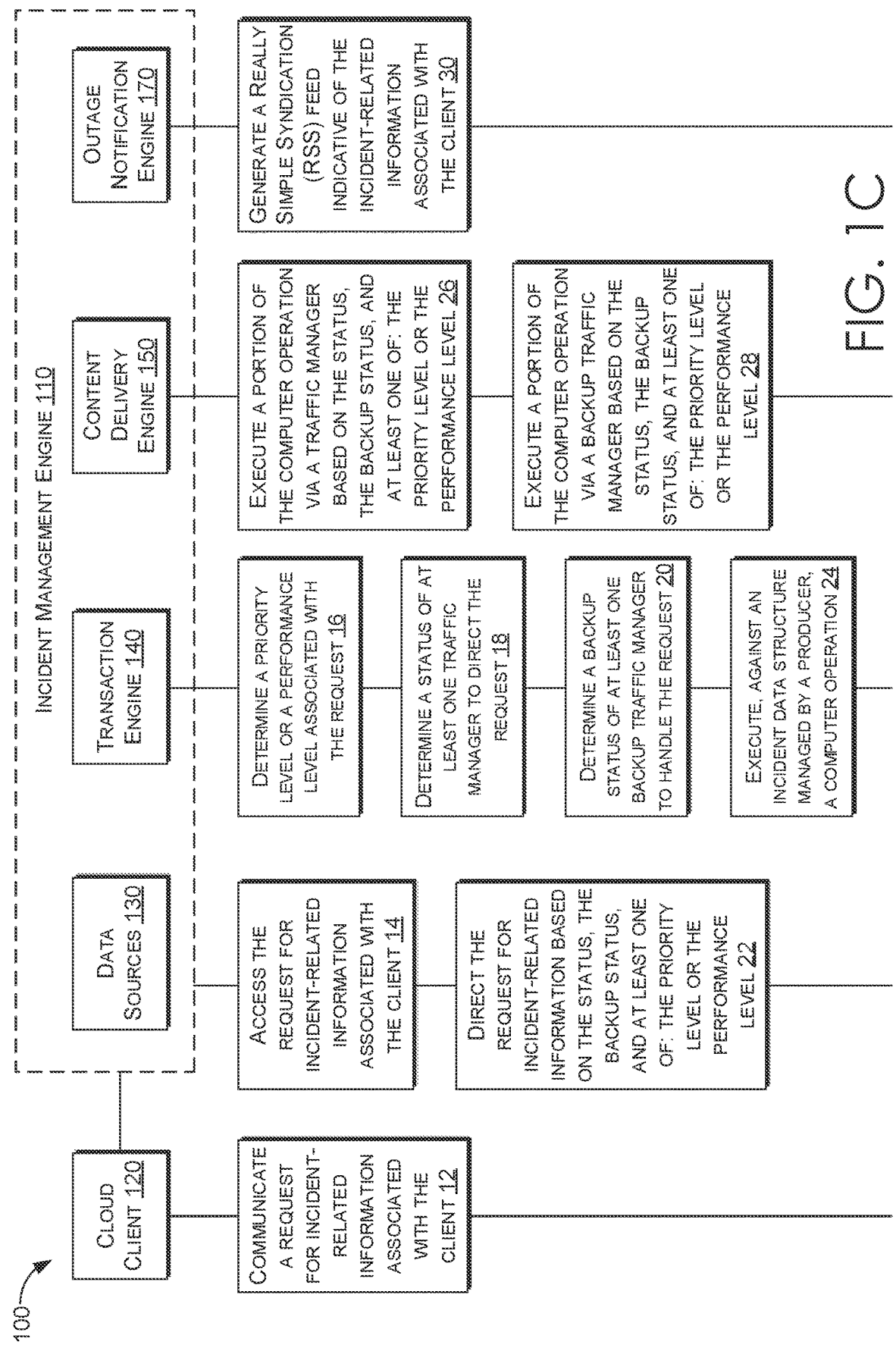
FIG. 1C is an example incident management system configured to generate an RSS feed regardless of an outage within the incident management system, in accordance with aspects of the technology described herein.

Aspects of the technical solution can be described by way of examples and with reference to FIG. 1A, FIG. 1B, and FIG. 1C. FIG. 1A illustrates an incident management system 100 having an incident management engine 110, a client device 120, a producer device 126, and network 180. As illustrated, the incident management engine 110 includes data sources 130, transaction engine 140, content delivery engine 150, and incident notification engine 170.

With reference to FIG. 1B, FIG. 1B includes an example incident management system 100 for providing, using an incident management engine 110 in an incident management system 100, an RSS feed indicative of incident-related information requested, in accordance with aspects of the technology described herein. FIG. 1B includes components that correspond to components described with reference to FIG. 1A. The incident management system 100 further includes client device 120 having client interface data 122; producer device 126 having producer interface data 128; data sources 130 having client request data 132, application gateway data 134, product catalog data 136, and active incident data 138; the transaction engine 140 having client-request processing engine 142, traffic management engine 144, backup traffic management engine 146, and load balancing engine 148; content delivery engine 150 having primary fetching engine 152 having data pull engine 154, and backup fetching engine 156 having data push engine 158; and incident notification engine 170 having fetched incident-related information 172 and RSS feed 174.

In some embodiments, the incident management system 100 is configured to provide an RSS feed indicative of incident-related information associated with the client in an incident management system 100. In some embodiments, the incident management system 100 includes the incident management engine 110 that operates with management engine clients (such as the management engines of client device 120 and producer device 126), manages generation of the RSS feed indicative of incident-related information requested by the client device 120, and provides the functionality described herein. The client device 120 and/or the producer device 126 include client-side computing logic and instructions that complement and supplement the server-side computing logic and instructions of the incident management engine 110 for providing the RSS feed. For example, the incident management system 100 (1) performs operations based on a client request for incident-related information associated with the client and (2) provides computing architecture and interfaces for accessing, communicating, and generating an RSS feed indicative of incident-related information, as described herein.

Client request data 132, application gateway data 134, product catalog data 136, and active incident data 138 can be stored and retrieved via data sources (e.g., data sources 130) of the incident management system 100 and can include data that support providing the services associated with an incident management system 100. For example, an incident management system 100 can support recording requests for incident-related information from any number of providers as the client request data 132 and recording traffic associated with the requests as application gateway data 134, where the incident management system 100 is enabled to manage client request data 132 and application gateway data 134. Additional data (e.g., metadata) associated with the client request data 132 and application gateway data 134 can be tracked and stored.

With reference to FIG. 1C, depicted is an example incident management system 100 for providing an RSS feed of incident-related information using an incident management engine 110 in the incident management system 100, in accordance with aspects of the technology described herein. FIG. 1C includes components that correspond to components described with reference to FIG. 1B. FIG. 1C includes client device 120 and incident management engine 110 having data sources 130, transaction engine 140, content delivery engine 150, and incident notification engine 170. In some embodiments, any block illustrated in FIG. 1C can be omitted, or additional or alternative blocks can be included other than those illustrated in FIG. 1C.

Operationally, at block 12, the client device 120 communicates a request for incident-related information associated with the client. At block 14, the incident management engine 110 accesses the request for incident-related information associated with the client. At block 16, the transaction engine 140 determines a priority level or a performance level associated with the end points associated with the request; at block 18, determines a status of at least one traffic manager configured to process or direct the request; and at block 20, determines a backup status of at least one backup traffic manager configured to process the request. At block 22, the incident management engine 110 directs the request for incident-related information based on the status, the backup status, and at least one of: the priority level or the performance level. At block 24, the transaction engine 140 executes, against an incident data structure managed by a producer, a computer operation. At block 26, the content delivery engine 150 executes a portion of the computer operation via a traffic manager based on the status, the backup status, and at least one of: the priority level or the performance level. At block 28, the content delivery engine 150 executes a portion of the computer operation via a backup traffic manager based on the status, the backup status, and at least one of: the priority level or the performance level. At block 30, the incident notification engine 170 generates a Really Simple Syndication (RSS) feed indicative of the incident-related information associated with the client.

Figure 2A:
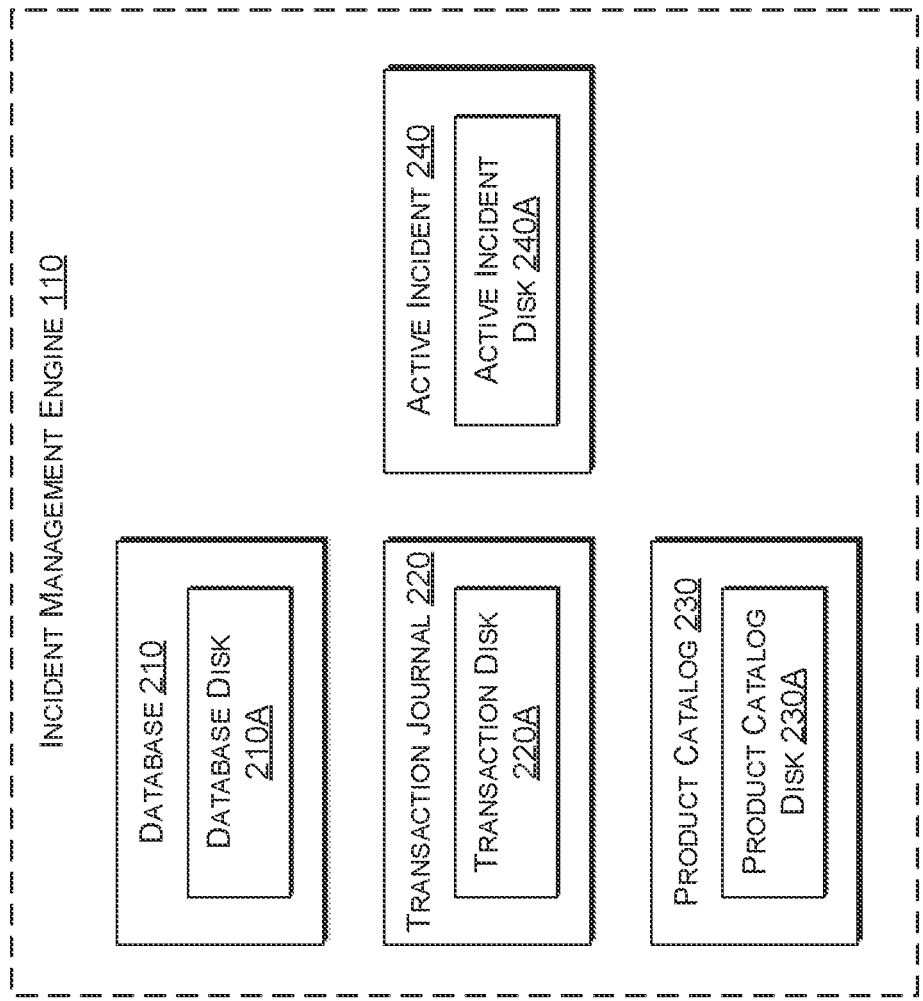
FIG. 2A is an example incident management system for storing client requests in a transaction journal, for storing product catalog data in a product catalog, and for storing active incident data as active incidents using an incident management engine in the incident management system, in accordance with aspects of the technology described herein.
Figure 2B:
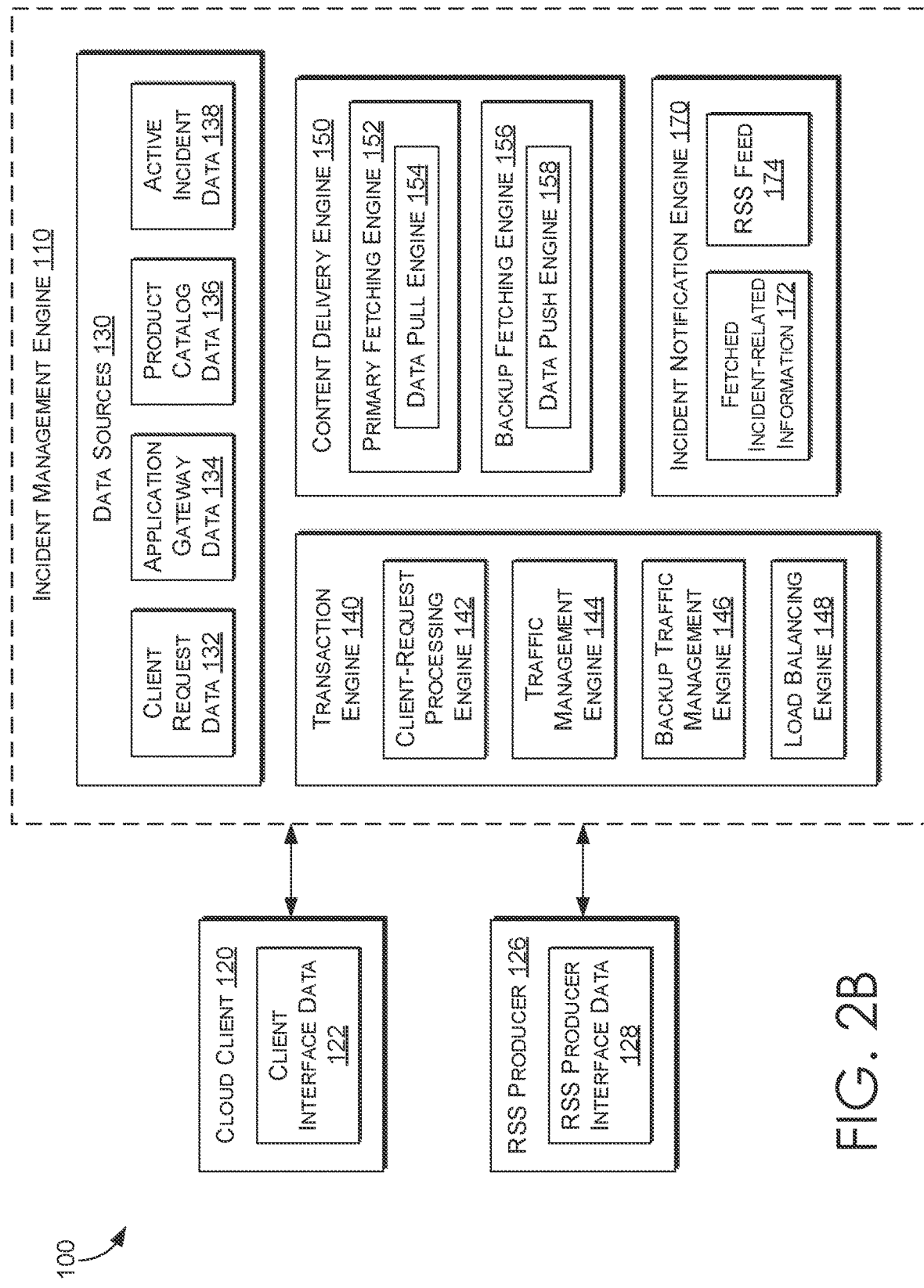
FIG. 2B is an example incident management system for generating an RSS feed regardless of an outage within the incident management system by using an incident management engine in the incident management system, in accordance with aspects of the technology described herein.

Overview of Example Environments for Providing the RSS Feed Indicative of Incident-Related Information Using an Incident Management Engine in an Incident Management System Aspects of the technical solution can be described by way of examples and with reference to FIGS. 2A and 2B. FIG. 2A is a block diagram of an example technical solution environment. This example environment is further described with reference to FIGS. 7 and 8, for example, for use in implementing embodiments of the technical solution are shown. Generally, the technical solution environment includes a technical solution system suitable for providing the example incident management system 100, which can employ methods of the present disclosure. In particular, FIG. 2A shows a high level architecture of the incident management system 100 in accordance with implementations of the present disclosure.

Among other engines, managers, generators, selectors, or components not shown (collectively referred to herein as "components"), the technical solution environment of incident management system 100 includes incident management engine 110. As illustrated, the incident management engine 110 includes a database 210 including database disk 210A, a transaction journal 220 including a transaction disk 220A, a product catalog 230 including product catalog disk 230A, active incidents 240 including active incident disk 240A. As discussed herein and with respect to the client request data 132 and the application gateway data 134 of FIG. 2B, the transaction journal 220 can log, in the transaction disk 220A, client requests for incident-related information from different clients. Similarly, the product catalog 230 can log a record of computational resources associated with certain users in the product catalog disk 230A and active incidents 240 can log a record of incident-related information associated the computational resources in the active incident disk 240A. In one embodiment, a producer writes XML data to the product catalog disk 230A and the active incident disk 240A so that the XML data can be pushed or pulled to generate the RSS feed indicative of the incident-related information, as discussed herein.

As such, embodiments of the incident management engine 110 record transactions indicative of a client request for incident-related information in the transaction disk 220A. For example, recording the client request in the transaction disk 220A comprises recording the client request and indexing the client request based on the client and/or the requested information. In one embodiment, recording the client request in the transaction disk 220A as transaction data includes generating a pointer based on the request. In one example, the pointer points to at least one of: an entry for a product catalog 230 in the product catalog disk 230A or an entry for an active incident 240 in the active incident disk 240A. Furthermore, the database 210 is configured to store any data, such as that stored in data sources 130 (FIG. 1). Although the database 210 is depicted as being included in a data disk, while the transaction journal 220 and the product catalog 230 are depicted as being included in respective log disks, it should be understood that the database 210, the transaction journal 220, and the product catalog 230 can be stored in any suitable storage device or memory device, including but not limited to the features discussed with respect to FIGS. 7 and 8.

The database 210 includes logic to process client requests for incident-related information. In some embodiments, the client requests include a DNS call. In one embodiment, the DNS call includes a query that contains a name (realized as a selection or input to a text field) and a record type. Example record types include canonical name (CNAME) records; pointer (PTR) records; a name server (NS) record; a mail exchange (MX) record; a start of authority (SOA) record; a text (TXT) record; and a service (SRV) record specifying a host and a port for specific services such as voice over IP (VOIP), instant messages, and so forth; to name a few. For example, a DNS call includes a query for an IP address made against a server name looking for an IP address. In another example, the DNS call includes a query for information on an NS record, an MX record, and other services (for example, SRV records include names, ports, weights and priorities). Example DNS responses contain answers to these questions, possibly more than one if the request requires that, and are not always just IP addresses.

In some embodiments and with respect to the transaction engine 140, the transaction journal 220 includes entries including client request data 132 and associated application gateway data 134 for responding to the requests. In some embodiments, the product catalog 230 includes entries including product catalog data 136. In one example, the product catalog 230 includes an indication of a product catalog stored on an incident data structure of the database 210 and that corresponds to the incident-related information associated with the client request. Embodiments of the product catalog 230 provide an indication of computational resources associated with a client and the corresponding level of functionality associated with the computational resources, for example, as defined by a service level agreement (SLA). As discussed herein, in one example, the active incident data 138 (FIG. 1B) includes an indication of an active incident that is associated with the client's computation resources, that is stored on an incident data structure of the database 210, and that corresponds to the incident-related information associated with the client request. In some embodiments, the active incidents 240 provide an indication of computational resources operating outside of normal operating parameters, such that that computational resources are experiencing an associated outage. In some embodiments, the product catalog 230 and the active incidents 240 are associated with incident-related information that is requested by the client and that is used by the incident notification engine 170 to generate and update the RSS feed 174 based on the client request for user-related information.

Turning to FIG. 2B, depicted is an example incident management system 100 for providing a RSS feed 174 indicative of incident-related information associated with the client using an incident management engine 110 in an incident management system 100, in accordance with aspects of the technology described herein. FIG. 2B includes components that correspond to components described with reference to FIG. 1B, but will now be discussed in more detail. In some embodiments, the incident management system 100 is implemented based on example environments, described with reference to FIGS. 7 and 8, that implement embodiments of the technical solution are shown.

In some embodiments, the client device 120 is communicatively coupled to the incident management engine 110. In one embodiment, the client interface data 122 is configured to cause the client device 120 to interact with the infrastructure, components, or services provided by the incident management engine 110. In one embodiment, the client interface data 122 includes logic to present graphical user interface (GUI) elements interactable to control data associated with the client device 120. In one example, the client interface data 122 includes logic or computer infrastructure to implement the embodiments of FIG. 6. In one embodiment, the GUI elements include selectable icons, drop down menus, scripting interfaces, text blocks, tables, and so forth. In some embodiments, the client device 120 submits requests for incident-related information. Certain request include a query formatted based on DNS. In the context of the client interface data 122 supporting DNS, the client device 120 can communicate a DNS call. As discussed herein, because, in some embodiments, the incident management engine 110 supports servicing of client requests for incident-related information, the client device 120 submits client inputs or requests, such as a DNS call, that are directed to a transaction engine 140 that sends the client request to a content delivery engine 150 that provides XML data used to populate the RSS feed by the incident notification engine 170.

In some embodiments, the RSS producer device 126 is communicatively coupled to the incident management engine 110. In one embodiment, the RSS producer interface data 128 is configured to cause the RSS producer device 126 to interact with infrastructure, components, or services provided by the incident management engine 110. In one embodiment, the RSS producer interface data 128 includes logic to present graphical user interface (GUI) elements interactable to control data associated with the RSS producer device 126. For example, the GUI elements include selectable icons, drop down menus, scripting interfaces, text blocks, tables, and so forth. In some embodiments, the RSS producer 126 submits data associated with the computing resources managed by the RSS producer and that are allocated to certain client devices 120. For example, the RSS producer 126 writes, submits, or uploads XML data associated with product catalog data 136 (of FIG. 1B) and/or active incident data 240 (of FIG. 2A). In one embodiment, the RSS producer 126 automatically writes, submits, or uploads XML data indicative of incident-related information associated with clients. In this manner, the RSS producer 126 makes certain incident-related information readily available to a client.

Continuing with FIG. 2B, the transaction engine 140 is configured to process requests from the client device 120 and direct the requests throughout the incident management system 100. Embodiments of the transaction engine 140 determine an optimal path to an end point for servicing the client requests. In some embodiments, the transaction engine 140 determines a priority and a performance associated with the end points associated with the client request. In some embodiments, the transaction engine 140 determines a status of the traffic manager and the backup traffic manager.

The client-request processing engine 142 of the transaction engine 140 generally receives a request or query from a client device 120. In one embodiment, the client-request processing engine 142 of the transaction engine 140 is configured with computing logic to receive the request for incident-related information from the client device 120. In one embodiment, the client-request processing engine 142 translates the client request into a computer operation. For example, the client request includes a query, made via a user input into a GUI associated with the client interface data 122. The client-request processing engine 142 may translate the user input into a DNS call. As discussed herein, in one example, the DNS call includes a name and a record type. In this manner, the client-request processing engine 142 can translate the client request into a uniform format that is processed by the other components of the transaction engine 140, the content delivery engine 150, and the incident notification engine 170.

In one embodiment, the client-request processing engine 142 of the transaction engine 140 is configured with computing logic to determine metadata associated with the request from the client device 120. For example, the client-request processing engine 142 determines priority information associated with the client or the request. In one example, "priority information" refers to a predetermined or dynamically calculated value or importance of different end points (associated with the request) or clients. For example, a priority value of one end point is higher than a priority value of another end point, such that the request is directed to the end point associated with the higher priority value instead of the end point associated with the lower priority value. In this example, the priority value is proportional to an importance or relative preference for having one end point handle the request over another end point; however, in some embodiments, the priority value is inversely proportional to the importance or relative preference for having one end point handle the request over another end point.

Alternatively or additionally, in some embodiments, the client-request processing engine 142 determines performance information associated with end points associated with the request. In one example, "performance information" refers to any suitable metrics indicative of a level of impact to a client's specific computing resource or overall computing resources. Example performance information includes cloud performance metrics measuring input/output operations per second (IOPS), file system performance, caching information, and auto-scaling information, to name a few. In one example, the performance information is used to determine or corresponds to the performance level. In one example, the performance information may include a binary indication regarding whether a particular component is operating or not. In another example, a performance value of one client is lower than a performance value of another client or event, such that the request associated with the lower performance value is processed before the request associated with the higher performance value. In this example, performance value is inversely proportional to a criticality of the client request; however, in some embodiments, the performance value is proportional to a criticality of the client request.

In some embodiments, the traffic management engine 144 of the transaction engine 140 is configured with computing logic to service client requests and direct the client requests to appropriate end points based on a traffic-routing method. In one embodiment, the traffic management engine 144 directs a client request to an end point within the fail-safe redundant architecture 300 of FIG. 3 to return an RSS feed with incident-related information responsive to the client request.

In one embodiment, the traffic management engine 144 processes client requests based on a traffic-routing method indicative of a priority level of the end points. For example, the traffic management engine 144 receives the priority information from the client-request processing engine 142. In one example, the priority information received from the client-request processing engine 142 includes the priority level, or, in some embodiments, the client-request processing engine 142 determines the priority level from the priority information. In this manner, the traffic management engine 144 can process the client requests based on the priority level associated with the request. For example, requests are preferentially directed to end points with a higher priority level instead of end points associated with a lower priority level. Alternatively, in one example, requests are preferentially directed to end points with a lower priority level instead of end points associated with a higher priority level.

In one embodiment, the traffic management engine 144 processes client requests based on a traffic-routing method indicative of a performance level of end points. For example, the traffic management engine 144 receives the performance information from the client-request processing engine 142. In one example, the performance information received from the client-request processing engine 142 includes the performance level, or, in some embodiments, the traffic management engine 144 determines the performance level from the performance information. In this manner, the traffic management engine 144 can process the client requests based on the performance level associated with end points associated with the request. For example, the request is directed to a first end point having a higher performance level, instead of a second end point having a lower performance level. Alternatively, in one example, the request is directed to a first end point having a lower performance level, instead of to a second end point having a higher performance level.

Continuing with FIG. 2B, in some embodiments, the backup traffic management engine 146 of the transaction engine 140 is configured with computing logic to service client requests and direct the client requests to appropriate end points based on a traffic-routing method. The traffic-routing method employed by the backup traffic management engine 146 may be the same or different than that employed by the traffic management engine 144. In one embodiment, the backup traffic management engine 146 processes client requests based on a traffic-routing method indicative of a priority level of the end points associated with the requests. For example, the backup traffic management engine 146 receives the priority information from the client-request processing engine 142. In one example, the priority information received from the client-request processing engine 142 includes the priority level, or another example, the client-request processing engine 142 determines the priority level from the priority information. In this manner, the backup traffic management engine 146 can process the client requests based on the priority level associated with the end points associated with the request. For example, end points having a higher priority level, instead of end points having a lower priority level, handle a portion of the computing operation associated with the request. As another example, suppose two end points are available to handle the request or a portion of the computing operation associated with the request. Further, suppose that a first end point has a higher priority level and a second end point has a lower priority level. In this example, the traffic management engine 144 directs the request or a portion of the computing operation associated with the request to the end point having the higher priority level, while the backup traffic management engine 146 directs the request or a portion of the computing operation associated with the request to the end point having the lower priority level. In this manner, numerous request can be processed in parallel and efficiently based on a priority level to increase throughput, and reduce latency associated with servicing multiple requests.

In one embodiment, the backup traffic management engine 146 processes client requests based on a traffic-routing method indicative of a performance level of the end points associated with the requests. For example, the backup traffic management engine 146 receives the performance information from the client-request processing engine 142. The performance information received from the client-request processing engine 142 may include the performance level, or in some embodiments, the backup traffic management engine 146 determines the performance level from the performance information. In this manner, the backup traffic management engine 146 can process the client requests based on the performance level associated with the end points associated with the request. For example, end points having a higher performance level, instead of end points having a lower performance level, handle a portion of the computing operation associated with the request. As another example, suppose two end points are available to handle the request or a portion of the computing operation associated with the request. Further, suppose that the first end point has a lower performance level and a second end point has a higher performance level. In this example, the traffic management engine 144 directs the request or a portion of the computing operation associated with the request to the end point having the lower performance level, while the backup traffic management engine 146 directs the request or a portion of the computing operation associated with the request to the end point having the higher performance level. In this manner, numerous request can be processed in parallel and efficiently based on a performance level to increase throughput, and reduce latency associated with servicing multiple requests.

Figure 3:
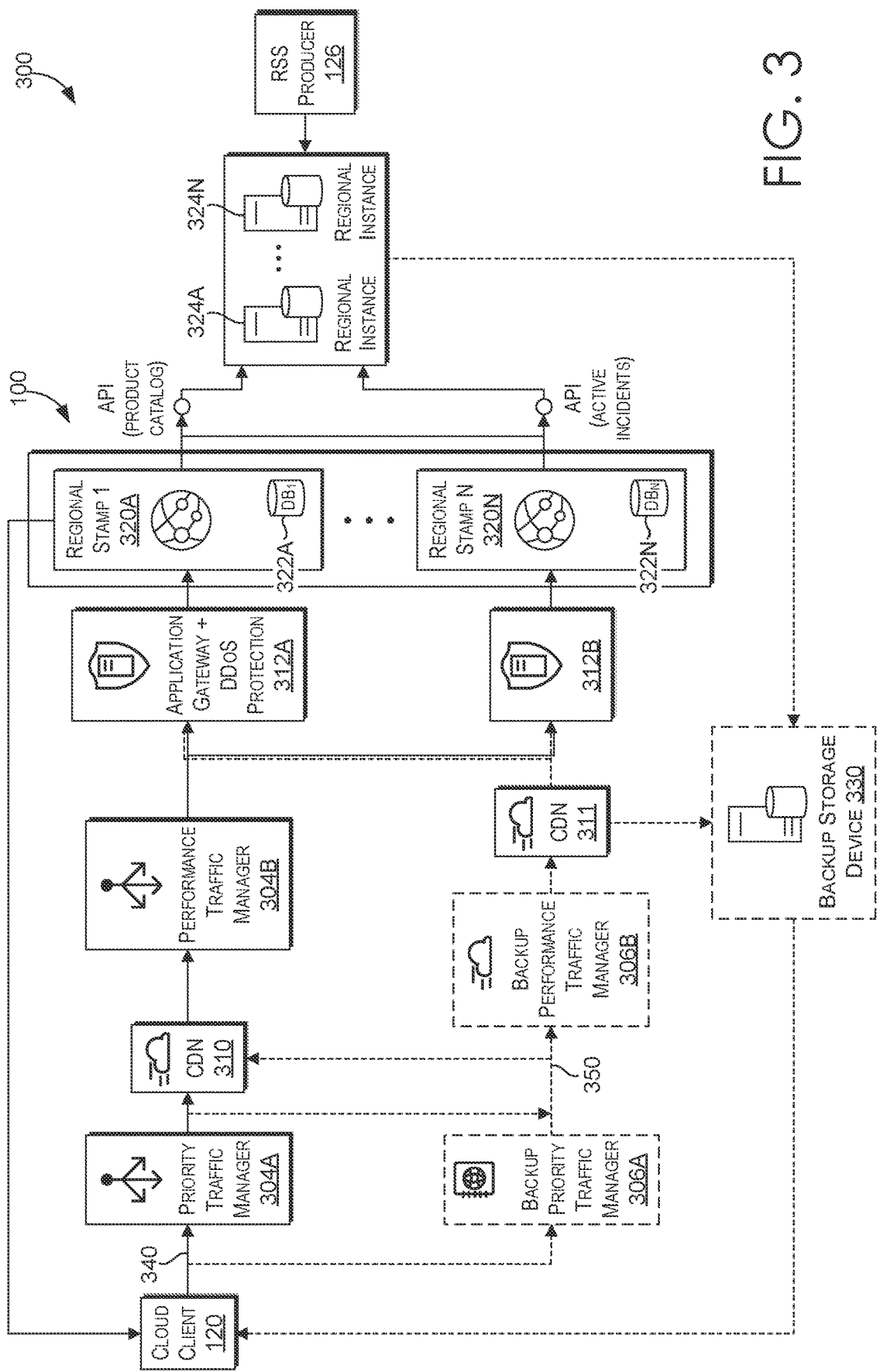
FIG. 3 is an example fail-safe, redundant architecture of an example incident management system for generating an RSS feed regardless of an outage within the incident management system by using an incident management engine, in accordance with aspects of the technology described herein.

Continuing with FIG. 2B, the load balancing engine 148 of the transaction engine 140 is configured to determine an optimal path to an end point for servicing the client requests. In some embodiments, the load balancing engine 148 of the transaction engine 140 is configured with computing logic to direct the client request through the incident management system 100, such as through the fail-safe, redundant architecture of the incident management system 100 of FIG. 3. For example, the load balancing engine 148 directs the client request through portions of the primary path 340 (FIG. 3) or portions of the secondary path 350 (FIG. 3). In some embodiments, the load balancing engine 148 directs the client request along an optimal path to an end point to reduce the cost, ensure a response to the client request, and reduce latency associated with retrieving the XML data used to generate and update the RSS feed indicative of the incident-related information. In one example, the load balancing engine 148 directs the request based on a status of the traffic manager 304 (FIG. 3) or backup traffic manager 306 (FIG. 3). In this example, the load balancing engine 148 directs the request to a backup traffic manager (as indicated by the corresponding backup status of "available" or "responsive") when the traffic manager is unavailable (as indicated by the corresponding status of "unavailable" or "non-responsive") to process the request. In this example, the load balancing engine 148 directs the client request to the backup traffic management engine 146 when the traffic management engine 144 is unable to process the request. As another example, the load balancing engine 148 directs a request to a traffic manager 304 (FIG. 3) or a backup traffic manager 306 (FIG. 3) based on the performance or priority associated with the end points associated with the request.

Continuing with FIG. 2B, the content delivery engine 150 is configured to retrieve upstream data from end points and communicate the data to the incident notification engine 170. In some embodiments, the content delivery engine 150 includes an application-level gateway (ALG) offering secure docket layer (SSL/TLS) termination, auto-scaling, zone redundancy, static VIP, web application firewall, ingress controller for Azure Kubernetes Service (AKS), uniform resource locater (URL)-based routing, and multiple-site hosting, to name a few. In the context of web application firewall, the content delivery engine 150 can support Distributed Denial of Service (DDoS) protection. In one example, DDoS protection is achieved by providing redundant internet connectivity, via the incident management system 100. In another example, DDoS protection is achieved by employing a web application firewall (WAF), supporting a structured query language (SQL) injection or cross-site request forgery. In one example, the methodologies employed to achieve DDoS protection are stored as application gateway data 134. In the context of zone redundancy, the content delivery engine 150 may access any number of region-specific front-end application services.

The primary fetching engine 152 is configured with computing logic to retrieve upstream XML data made available by the RSS producer 126. For example, the primary fetching engine 152 retrieves data, along the primary path 340 (FIG. 3), made available by the RSS producer 126. In one embodiment, the primary fetching engine 152 stores, in data sources 130 or retrieves from data sources 130, XML data as product catalog data 136 or as active incident data 138. For example, the primary fetching engine 152 stores the retrieved XML data in the storage device 322 of a front-end regional service of FIG. 3. In one embodiment, the primary fetching engine 152 generates a command for retrieving the incident-related information from the data source 130 and communicating the retrieved incident-related information to the client device 120. For example, the primary fetching engine 152 determines product catalog data 136 and active incident data 138 associated with the client request. In this example, the primary fetching engine 152 performs a query against the data sources 130 for incident-related information corresponding to the client and including the incident-related information specified in the client request.

In some embodiments, the data pull engine 154 of the content delivery engine 150 is configured with computing logic to pull data, such as upstream XML data. In one example, the data pull engine 154 pulls upstream XML data from RSS producers 126 hosting or creating the data. For example, the data pull engine 154 pulls upstream XML data indicative of incident-related information managed by RSS producers 126. In one embodiment, the data pull engine 154 employs application programming interfaces (APIs) to communicate with the services managed by the RSS producer 126. For example, the data pull engine 154 generates an API pull request for incident-related information from the RSS producer 126 as requested by the client. The data pull engine 154 may use the API pull request to retrieve pull requests matching the criteria specified by the client request.

The backup fetching engine 156 is configured with computing logic to retrieve upstream XML data made available by the RSS producer 126. For example, the primary fetching engine 152 retrieves data, along the secondary fetching path 350 (FIG. 3), made available by the RSS producer 126. In one embodiment, the backup fetching engine 156 stores, in data sources 130 or retrieves from data sources 130, XML data as product catalog data 136 or as active incident data 138. For example, the backup fetching engine 156 stores the retrieved XML data in the backup storage device 330 of FIG. 3. In one embodiment, the backup fetching engine 156 generates a command for retrieving the incident-related information from the data source 130 and communicating the retrieved incident-related information to the client device 120. For example, the backup fetching engine 156 determines product catalog data 136 and active incident data 138 associated with the client request. In this example, the backup fetching engine 156 performs a query against the data sources 130 for incident-related information corresponding to the client and including the incident-related information specified in the client request.

In some embodiments, the data push engine 158 of the content delivery engine 150 is configured with computing logic to receive pushed data, such as upstream XML data, that is pushed to the data source 130 by RSS producers 126. The XML data may be pushed based on a static push operation. In one example, the data push engine 158 receives upstream XML data pushed from RSS producers 126 hosting or creating the data. For example, the data push engine 158 receives upstream XML data indicative of incident-related information managed and pushed to the data push engine 158 by a regional instance 324 (FIG. 3) associated with RSS producers 126. In one embodiment, the data push engine 158 employs application programming interfaces (APIs) to communicate with the services managed by the RSS producer 126. For example, the data push engine 158 receives the upstream XML data based on an API push request for incident-related information requested by the client. Embodiment of the data push engine 158 use the API push to allow the RSS producer 126 to communicate with the data push engine 158 to store the incident-related information in the data sources 130. For example, the API push receives asynchronous communication from the RSS producer 126. In this manner, the backup fetching engine 156 provides time-sensitive information whenever the information becomes known rather than waiting for the client to request the incident-related information.

Continuing with FIG. 2B, embodiments of the incident notification engine 170 receive fetched incident-related information 172 and generate an RSS feed 174 indicative of incident-related information requested by the client based on the product catalog data 136 and/or the active incident data 138 received from the content delivery engine 150. In one example, the incident notification engine 170 receives fetched incident-related information 172 from the content delivery engine 150. The fetched incident-related information 172 corresponds to the incident-related information requested by the client. In one embodiment, the fetched incident-related information 172 is formatted as XML. Thereafter, the incident notification engine 170 compiles the XML data and converts the XML data into an RSS feed 174 indicative of the incident-related information.

The incident notification engine 170 may communicate the RSS feed 174 to the client device 120 even when components employing the traffic management engine 144, the backup traffic management engine 146, the load balancing engine 148, the primary fetching engine 152, or the backup fetching engine 156 experience an outage because the other components in the incident management system 100 are able to perform the operations that the component experiencing the outage would otherwise perform. In one embodiment, the incident notification engine 170 performs aspects of the embodiments of FIG. 6.

Turning to FIG. 3, depicted is an example fail-safe, redundant architecture 300 for an example incident management system 100 for generating an RSS feed 174 (FIG. 2B) regardless of an outage within the incident management system 100 by using an incident management engine 110 (FIGS. 1A, 1B, 1C, 2A, and 2B), in accordance with aspects of the technology described herein.

In some embodiments, the incident management system 100 includes at least one traffic manager 304 and at least one backup traffic manager 306. In one embodiment, the traffic manager 304 and backup traffic manager 306 are arranged in parallel to each other. In the example fail-safe, redundant architecture 300, the incident management system 100 includes a priority traffic manager 304A and a performance traffic manager 304B arranged in series to each other, as well as a backup priority traffic manager 306A and a backup performance traffic manager 306B arranged in series to each other. Although in the illustrated embodiment, the priority traffic manager 304A is upstream from the performance traffic manager 304B, in some embodiments, the performance traffic manager 304B is upstream from the priority traffic manager 304A. Similarly, although in the illustrated embodiment, the backup priority traffic manager 306A is upstream from the backup performance traffic manager 306B, in some embodiments, the backup performance traffic manager 306B is upstream from the backup priority traffic manager 306A. In one embodiment, any of the depicted components are combined. For example, the backup priority traffic manager 306A and the backup performance traffic manager 306B are combined into one single hybrid manager that directs the requests based on both the priority level and performance level of end points associated with the request.

Additionally, the example fail-safe, redundant architecture 300 of the incident management system 100 includes a network, such as the primary CDN 310 and the secondary CDN 311. In the example fail-safe, redundant architecture 300, the primary CDN 310 communicatively couples the priority traffic manager 304A, the performance traffic manager 304B, and the backup priority traffic manager 306A. Additionally, in this example, the secondary CDN 311 communicatively couples the backup performance traffic manager 306B to downstream end points, such as the illustrated ALGs 312A, 312B and a backup storage device 330. The example fail-safe, redundant architecture 300 of the incident management system 100 includes two ALGs 312A, 312B that direct client requests received from the traffic managers 304 or the backup traffic managers 306 to any number of regional services 320. In some embodiments, the regional services 320 correspond to front-end regional services. The example fail-safe, redundant architecture includes an n number of regional services 320, where n is a real integer such as 1, 2, 3, 4, and so forth. In one embodiment, the regional services 320 include corresponding storage device 322 that store XML data that the regional services 320 pull from any number of regional instances 324 associated with RSS producers 126 (FIG. 2B). The RSS producer 126 may write XML data to an m number of regional instances 324, such that m is a real integer such as 1, 2, 3, 4, and so forth. As illustrated, the example fail-safe, redundant architecture 300 of the incident management system 100 includes a backup storage device 330 that is communicatively coupled to the priority traffic manager 304A and the backup priority traffic manager 306A via the backup performance traffic manager 306 and/or the CDN 310. In some embodiments, the RSS producer 126 pushes incident-related information to the backup storage device via the regional instances 234.

Taking the illustrated fail-safe, redundant architecture 300 of the incident management system 100 as an example, components of the fail-safe, redundant architecture 300 have end points. For example, a request that is being directed by the backup performance traffic manager 306B is directed via the secondary CDN 311 to either one of the ALGs 312 or the backup storage device 330. In this example, any of the downstream components, such as the secondary CDN 311, the ALGs 312, or the backup storage device 330 are the end points of the backup performance traffic manager 306B. In the illustrated embodiment, the end points for a corresponding component can be identified based on the illustrated arrows defining one example path for directing the request.

Continuing with FIG. 3, embodiments of the priority traffic manager 304A and the performance traffic manager 304B employ aspects of the client-request processing engine 142 and the traffic management engine 144. In one embodiment, the backup priority traffic manager 306A and the backup performance traffic manager 306B employ aspects of the client-request processing engine 142 and the backup traffic management engine 146. In one embodiment, the primary CDN 310 and the secondary CDN employ aspects of the load balancing engine 148. In one embodiment, the ALG 312s, the regional service 320, or the backup storage device 330 employ aspects of the content delivery engine 150. For example, the regional service 320 or any component along the solid line 340 in FIG. 3 employs aspects of the primary fetching engine 152. As another example, the backup storage device 330 or any component along the dashed line, illustrating the backup path 350, employs aspects of the backup fetching engine 156. However, it should be understood that any component of FIG. 3 can employ any component from FIG. 2B.

As illustrated, the fail-safe, redundant architecture 300 of the incident management system 100 includes a primary path 340 (illustrated with a solid line) and a backup path 350. In some embodiments, the primary path 340 is the default direction for routing the client requests for incident-related information to generate the RSS feed 174 (FIGS. 1B and 2B). In some embodiments, the components along the primary path 340 have a higher priority level than the corresponding components along the backup path 350. For example, when both the components along the primary path 340 and components along the backup path 350 (illustrated with a dashed line) have an active status (indicating that they are operational in the incident management system), the incident management system 100 defaults to directing a client request along the primary path 340. In another example when a request is received and both the components along the primary path 340 and components along the backup path 350 have an active status (for example, as indicated by the performance level), then the client request is directed to the end point having a higher priority level or a lower performance level. In yet another example, the client request is directed to the end point having a lower priority level or a higher performance level.

To help illustrate, the example fail-safe, redundant architecture 300 of the incident management system 100 receives a client request (from client device 120) for incident-related information. In one embodiment, the client request includes a DNS call that is directed either to the priority traffic manager 304A or the backup priority traffic manager 306A. In one example, active-active DNS routing is employed to direct client requests to either the priority traffic manager 304A or the backup priority traffic manager 306A. In one example, the priority traffic manager 304A employs aspects of the transaction engine 140 to determine a priority of the end points associated with the client request; based on the priority level, the client request is either directed along the primary path 340 or the backup path 350. If directed along the primary path 340, the client request is further directed to the CDN 310 where the client request is communicated to the performance traffic manager 304B. If directed along the backup path 350, the client request is directed to the backup performance traffic manager 306B via the backup priority traffic manager 306A.

Continuing this example, suppose the client request is directed along the primary path 340 after being processed by the performance traffic manager 304B; thereafter, the client request is directed to the ALG 312 (either first ALG 312A or ALG 312B) and then to one of the regional services 320. In one example, the regional services 320 generate a computer operation to pull the incident-related information (for example, as XML data) from any number of regional instances 324 associated with RSS producers 126.

Continuing the example above, instead, suppose that the client request is directed along the backup path 350 after being processed by the priority traffic manager 304A; thereafter, the client request is directed to the backup performance traffic manager 306B. In this example, the client request is then directed to the backup storage device 330. In one embodiment, directing the client request to the backup storage device 330 includes generating a computer operation to retrieve the requested incident-related information. Embodiments of the backup storage device 330 store the incident-related information pushed by the producer via the regional instances 324. In this manner, the computer operation is executed against the backup storage device 330 to retrieve the incident-related information, and communicate the incident-related information to the client as an RSS feed 174.

In some embodiments, if any components in the illustrated fail-safe, redundant architecture 300 experience an outage preventing the corresponding component from servicing the client request, other components in the fail-safe, redundant architecture 300 perform the operation originally designated for the performance by the component experiencing the outage. In one example, "redundant architecture" describes the fail-safe nature of the architecture, whereby an outage of one component within the incident management system 100 does not prevent the request from being processed because the request is still processed by another component that can process the portion of the request originally intended for the component experiencing the outage.

As a first example, if the priority traffic manager 304A experiences an outage preventing it from servicing the client request, the backup priority traffic manager 306A performs at least one of the computer operations intended to be performed by the priority traffic manager 304A. Similarly, if the backup priority traffic manager 306A experiences an outage preventing it from servicing the client request, the priority traffic manager 304A performs at least one of the computer operations intended to be performed by the backup priority traffic manager 306A. The outage discussed in this example, as well as other incident-related information, is pushed to or pulled from the regional instances 324 associated with the corresponding RSS producer 126 as part of the incident-related information requested by the client.

As a second example, if the primary CDN 310 or the performance traffic manager 304B experiences an outage preventing either one of them from servicing the client request, the secondary CDN 311 performs at least one of the computer operations intended to be performed by the primary CDN 311 and/or the performance traffic manager 304B. In this manner, the secondary CDN 311 may serve as a backup to the primary CDN 310 to direct requests that the CDN 310 is unable to direct. Similarly, if the secondary CDN 311 experiences an outage preventing it from servicing the client request, the primary CDN 310 performs at least one of the computer operations intended to be performed by the secondary CDN 311. The outage discussed in this example, as well as other incident-related information, is pushed to or pulled from the regional instances 324 associated with the corresponding RSS producer 126 as part of the incident-related information requested by the client.

As a third example, if the backup storage device 330 experiences an outage preventing it from servicing the client request, the backup performance traffic manager 306B directs the client request to the ALG 312 and the regional services 320. Similarly, if the ALGs or the regional services 320 experience an outage preventing them from servicing the client request, the backup performance traffic manager 306B directs the client request to the backup storage device 330 to cause the incident-related information request by the client to be retrieved from the backup storage device 330. The outage discussed in this example, as well as other incident-related information, is pushed to or pulled from the regional instances 324 associated with the corresponding RSS producer 126 as part of the incident-related information requested by the client.

As a fourth example, if the first ALG 312A experiences an outage preventing it from servicing the client request, the second ALG 312B performs at least one of the computer operations intended to be performed by the first ALG 312A. Similarly, if the second ALG 312B experiences an outage preventing it from servicing the client request, the first ALG 312A performs at least one of the computer operations intended to be performed by the second ALG 312B. The outage discussed in this example, as well as other incident-related information, is pushed to or pulled from the regional instances 324 associated with the corresponding RSS producer 126 as part of the incident-related information requested by the client.

As a fifth example, if one of the regional services 320 experiences an outage preventing it from servicing the client request, another one of the regional services 320 performs at least one of the computer operations intended to be performed by regional services 320 experiencing the outage. The outage discussed in this example, as well as other incident-related information, is pushed to or pulled from the regional instances 324 associated with the corresponding RSS producer 126 as part of the incident-related information requested by the client.

Indeed, the redundancy of the architecture 300 of the incident management system 100 causes client requests for incident-related information to be serviced and a corresponding RSS feed 174 to be generated or updated despite outages within the fail-safe, redundant architecture 300 of the incident management system 100.

Figure 4:
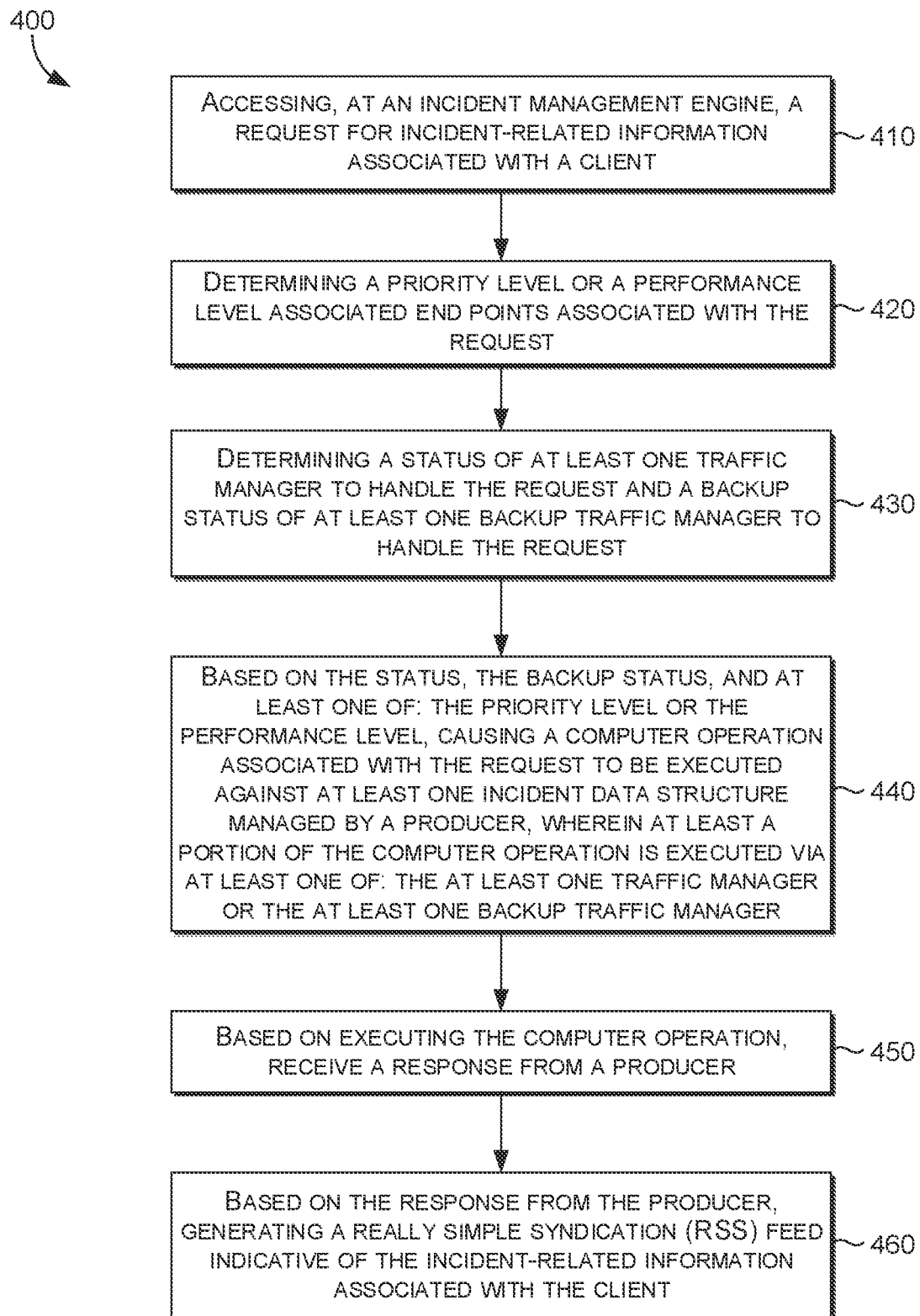
FIG. 4 provides a first example method of generating an RSS feed indicative of incident-related information using an incident management engine in an incident management system, in accordance with aspects of the technology described herein.
Figure 5:
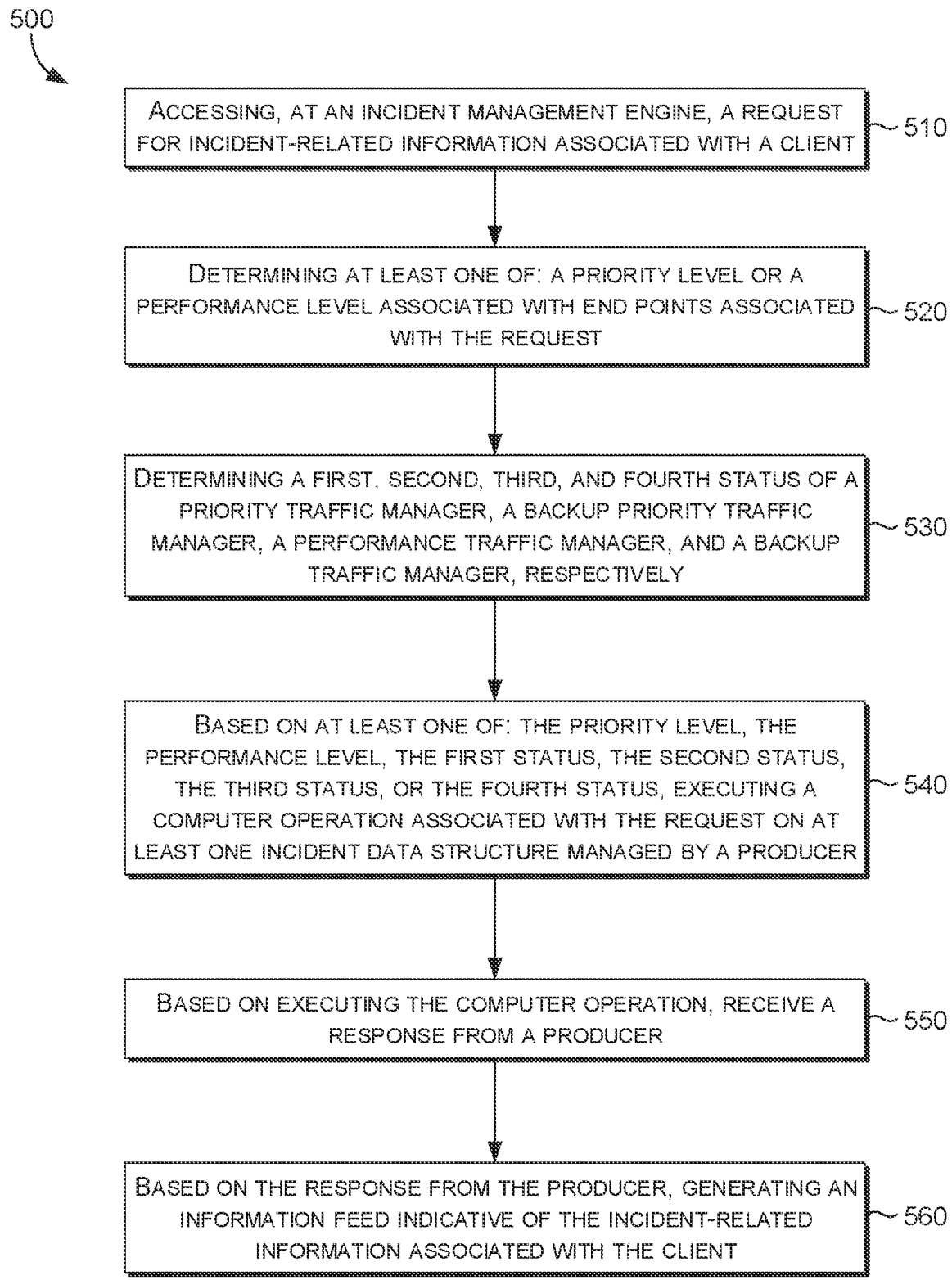
FIG. 5 provides a second example method of generating an RSS feed indicative of incident-related information using an incident management engine in an incident management system, in accordance with aspects of the technology described herein.
Figure 6:
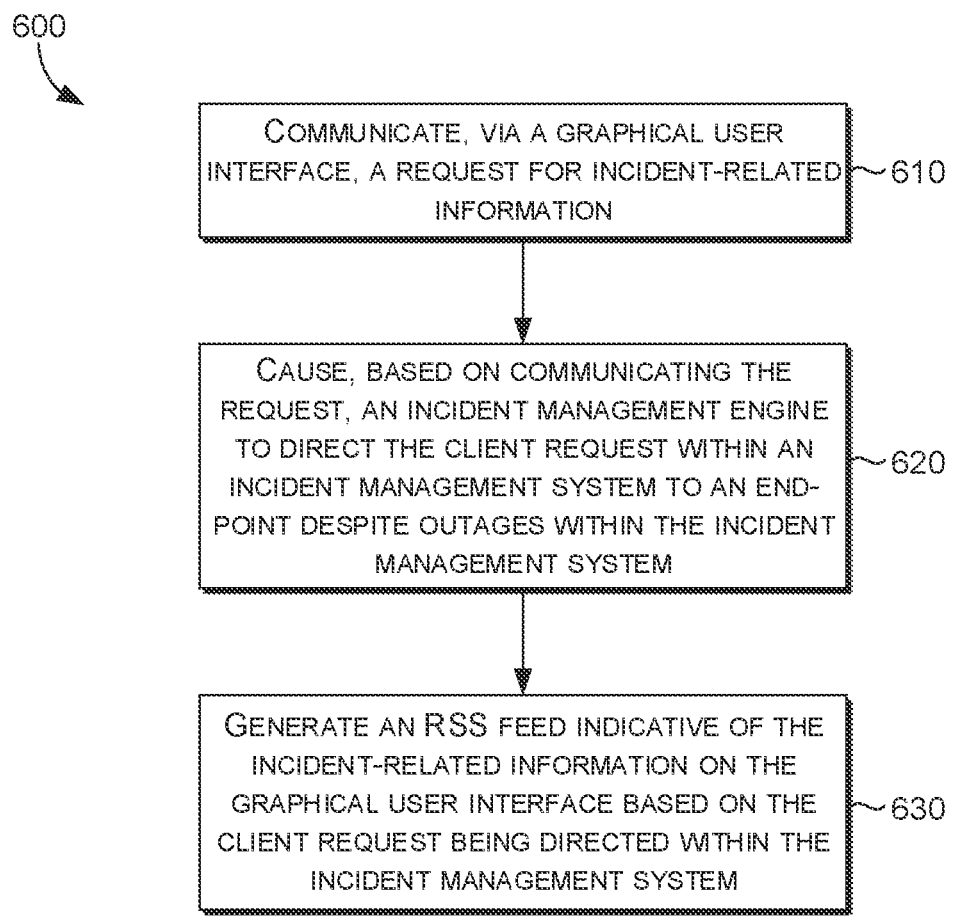
FIG. 6 provides a third example method of generating an RSS feed indicative of incident-related information using an incident management engine in an incident management system, in accordance with aspects of the technology described herein.

With reference to FIGS. 4, 5, and 6, flow diagrams are provided illustrating methods associated with generating or updating an RSS feed 174 (FIGS. 1B and 2B) indicative of incident-related information using an incident management engine 110 (FIGS. 1-2) in an incident management system 100 (e.g., FIGS. 1-2). In some embodiments, one or more components of the incident management system 100, the client device 120 (FIGS. 1-2), and/or the RSS producer 126 (FIGS. 1-2) are configured to perform the methods illustrated in FIGS. 4, 5, and 6. In some embodiments, one or more computer-storage media having computer-executable or computer-useable instructions embodied thereon that, when executed by one or more processors, cause the one or more processors to perform the methods (e.g., computer-implemented method) in the incident management system 100 (e.g., a computerized system or computing system).

Turning to the process 400 illustrated in FIG. 4, the incident management engine 110 accesses (block 410) a request for incident-related information associated with a client. In one embodiment, the incident-related information corresponds to computing resources associated with the client device 120 (FIGS. 1-2), and the status of which is provided or managed by the RSS producer 126.

As illustrated, the incident management engine 110 determines (block 420) a priority level or performance level associated with the end points associated with the request. In some embodiments, the priority level is used by the priority traffic manager 304A (FIG. 3) or the backup priority traffic manager 306A (FIG. 3) to direct the client request, and the performance level is used by the performance traffic manager 304B (FIG. 3) or the backup performance traffic manager 306B (FIG. 3) to direct the client request.

Process 400 includes determining (block 430) a status of at least one traffic manager 304 to process the client request and a backup status of at least one backup traffic manager 306 to process the request. In one embodiment, the at least one traffic manager includes the priority traffic manager 304A and the performance traffic manager 304B, and the at least one backup traffic manager includes the backup priority traffic manager 306A and the backup performance traffic manager 306B.

Additionally, process 400 includes, based on the status, the backup status, and at least one of: the priority level or the performance level, causing (block 440) a computer operation associated with the client request to be executed against at least one incident data structure managed by an RSS producer 126. At least a portion of the computer operation is executed via at least one of: the at least one traffic manager 304 or the at least one backup traffic manager 306.

As illustrated, process 400 includes receiving (block 450) a response from the RSS producer 126 based on the computer operation being executed. Thereafter, an RSS feed 174 indicative of the incident-related information associated with the client is generated (block 460) or updated based on the response from the RSS producer 126.

Turning to the process 500 illustrated in FIG. 5, the incident management engine 110 accesses (block 510) a request for incident-related information associated with a client. In one embodiment, the incident-related information corresponds to computing resources associated with the client device 120 (FIGS. 1-2), and the status of which is provided or managed by the RSS producer 126.

As illustrated, the incident management engine 110 determines (block 520) at least one of: a priority level or performance level associated with the end points associated with the request. In some embodiments, the priority level is used by the priority traffic manager 304A (FIG. 3) or the backup priority traffic manager 306A (FIG. 3) to direct the client request, and the performance level is used by the performance traffic manager 304B (FIG. 3) or the backup performance traffic manager 306B (FIG. 3) to direct the client request.

Process 500 includes determining (block 530) a first, second, third, and fourth status of a priority traffic manager 304A, a backup priority traffic manager 306A, a performance traffic manager 304B, and a backup performance traffic manager 306B, respectively. The first, second, third, and fourth status provide an indication of whether the corresponding device (for example, the priority traffic manager 304A, the backup priority traffic manager 306A, the performance traffic manager 304B, and the backup performance traffic manager 306B, respectively) are active within the incident management system 100 and able to process the client request.

Additionally, process 500 includes, based on at least one of: the priority level, the performance level, the first status, the second status, the third status, or the fourth status, causing (block 540) a computer operation associated with the client request to be executed against at least one incident data structure (stored in the data source 130) managed by an RSS producer 126. At least a portion of the computer operation is executed via at least one of: the at least one traffic manager 304 or the at least one backup traffic manager 306.

As illustrated, process 500 includes receiving (block 550) a response from the RSS producer 126 based on the computer operation being executed. Thereafter, an RSS feed 174 (FIGS. 1B and 2B) indicative of the incident-related information associated with the client is generated (block 560) or updated based on the response from the RSS producer 126.

Turning to FIG. 6, process 600 includes communicating (block 610), via a graphical user interface, a request for incident-related information. In some embodiments, process 600 is implemented by the client device 120 (FIGS. 1-2). Process 600 further includes causing (block 620), based on communicating the request, an incident management engine to direct the client request within an incident management system 100 (FIGS. 1-3) to an end-point (for example, the front-end regional service 320 of FIG. 3 or the backup storage device 330 of FIG. 3) despite outages within the incident management system 100. Additionally, process 600 includes generating (block 630) an RSS feed 174 (FIGS. 1B and 2B) indicative of the incident-related information on the graphical user interface based on the client request being directed within the incident management system 100.

Example Computing Environment

Figure 7:
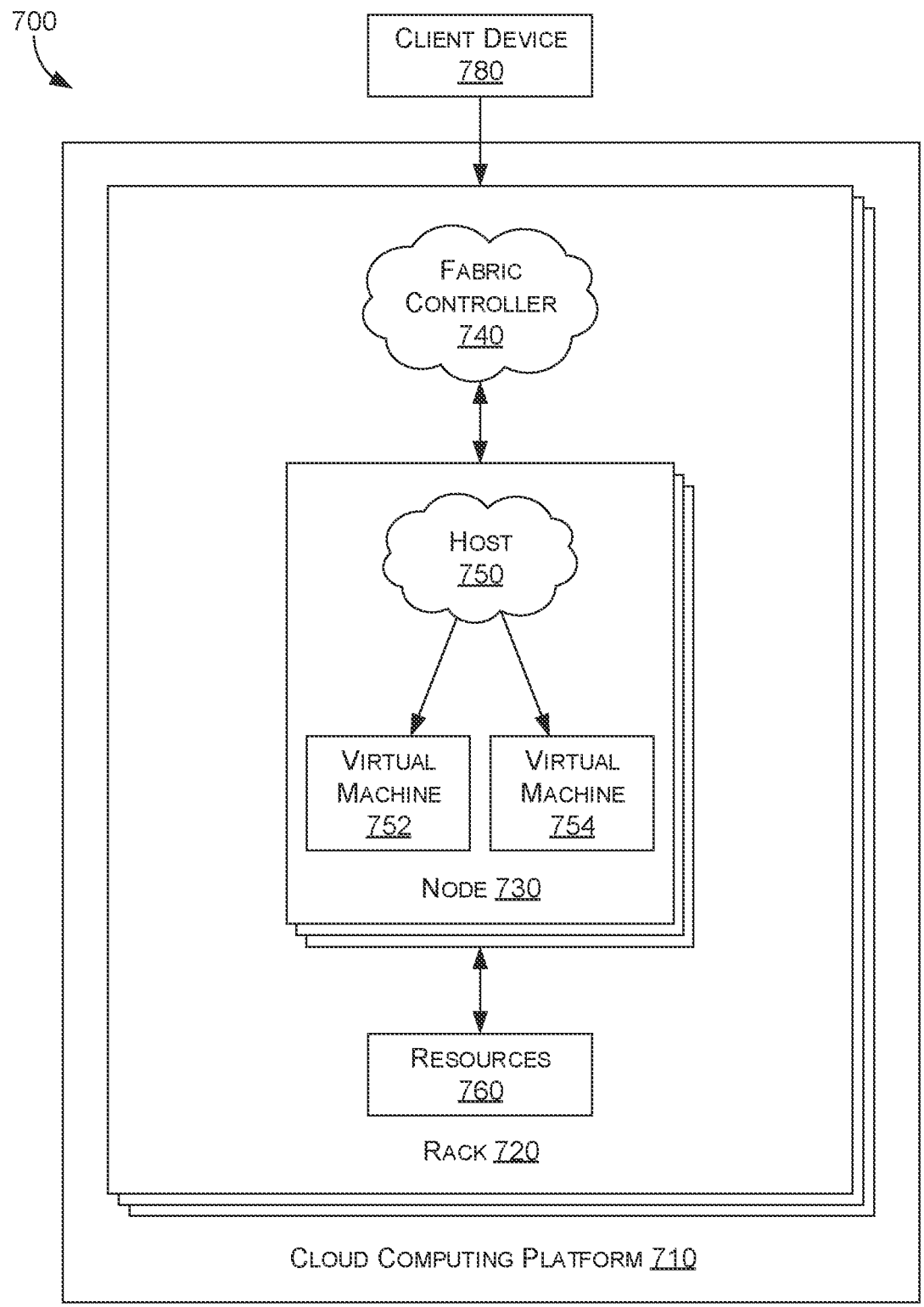
FIG. 7 provides a block diagram of an example distributed computing environment suitable for use in implementing aspects of the technology described herein.
Figure 8:
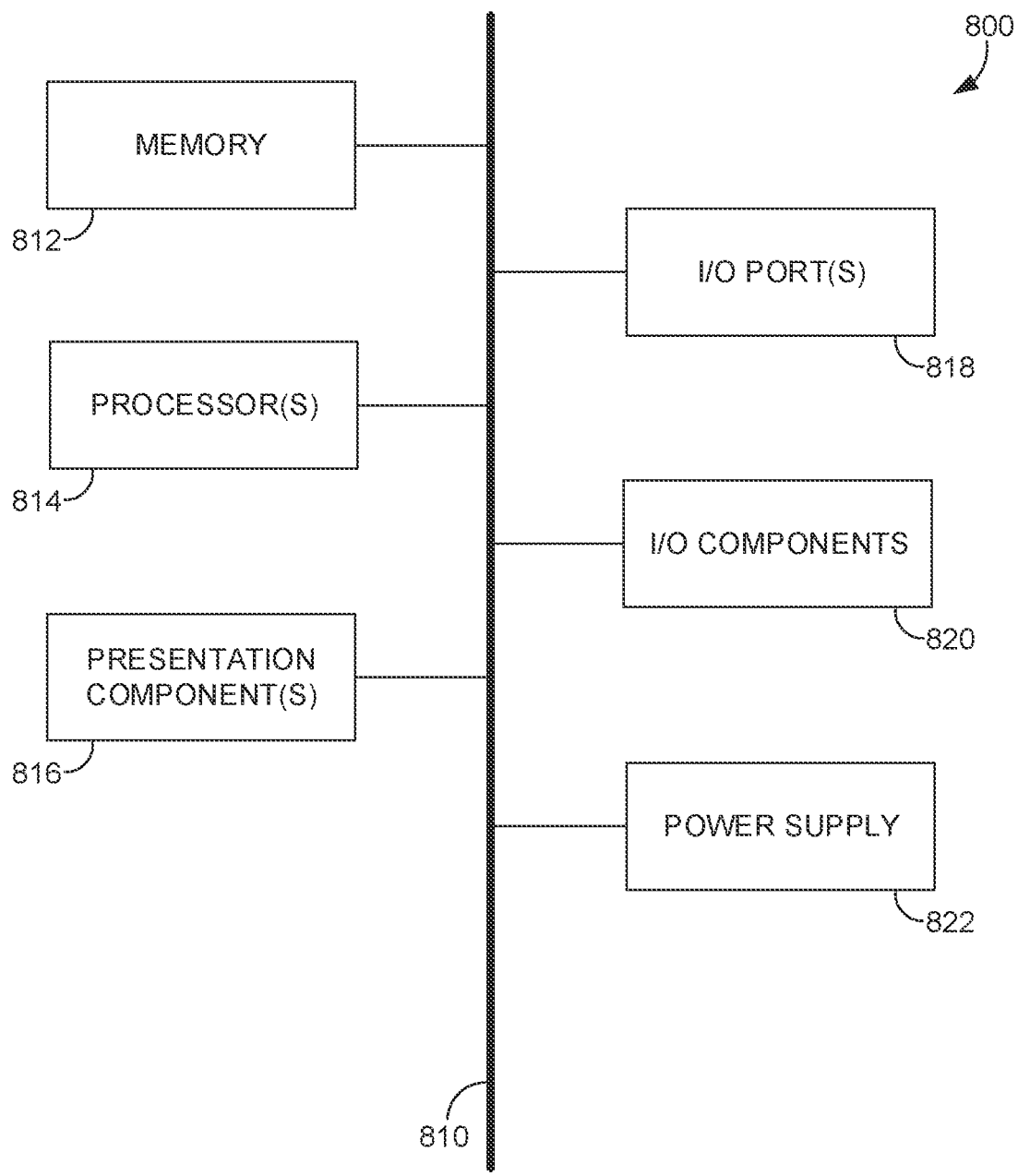
FIG. 8 is a block diagram of an example computing environment suitable for use in implementing aspects of the technology described herein.

Having described various implementations, example computing environments suitable for implementing embodiments of the disclosure are now described, including an example distributed computing environment and an example computing device in FIGS. 7 and 8, respectively. Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions include any software, including low level software written in machine code, higher level software such as application software, and any combination thereof. In this regard, the system components can manage resources and provide services for system functionality. Any other variations and combinations thereof are contemplated with the embodiments of the present disclosure.

Referring now to FIG. 7, FIG. 7 illustrates an example distributed computing environment 700 in which implementations of the present disclosure can be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of end points of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node. Client device 780 may be linked to a service application in cloud computing platform 710. Client device 780 may be any type of computing device, which may correspond to computing device 800 described with reference to FIG. 8. For example, client device 780 is configured to issue commands to cloud computing platform 710. In embodiments, client device 780 communicates with service applications through a virtual Internet Protocol (IP) and load balancer or other means that direct communication requests to designated end points in cloud computing platform 710. The components of cloud computing platform 710 may communicate with each other over a network (not shown), which may include, without limitation, one or more local area networks (LANs) and/or wide area networks (WANs).

With reference to FIG. 8, an example computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated. Computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. A presentation component, such as a display device, is an example of an I/O component. Also, processors have memory. It is recognized that such is the nature of the art, and reiterated that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. As used herein, the term processor or "a processor" may refer to more than one computer processor. In one example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 816 present data indications to a user or other device. Example presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described herein. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely example. Components can be configured for performing novel aspects of embodiments, where the term "configured for" can refer to "programmed to" perform particular tasks or implement particular abstract data types using code. Further, while embodiments of the present invention generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A redundant computerized system to deliver incident-related information despite outages associated with components configured to deliver the incident-related information, the redundant computerized system comprising:
    a computer processor; and
    computer memory storing computer-useable instructions that, when executed by the computer processor, cause the computer processor to perform operations comprising:
        accessing, via an incident management system, a request for the incident-related information associated with a client;
        determining at least one of: a priority level or a performance level of at least one end point corresponding to a respective downstream device to process the request;
        determining a status of a traffic manager to process the request and a backup status of a backup traffic manager to process the request,
            wherein the traffic manager comprises a priority traffic manager configured to process the request based on the priority level and a performance traffic manager configured to process the request based on the performance level, and wherein the priority traffic manager and the performance traffic manager are communicatively coupled in series and separate from each other, and
            wherein the backup traffic manager comprises a backup priority traffic manager serving as backup for the priority traffic manager and configured to process the request based on the priority level, wherein the backup traffic manager comprises a backup performance traffic manager serving as a backup for the performance traffic manager and configured to process the request based on the performance level, wherein the backup priority traffic manager and the backup performance traffic manager are communicatively coupled in series to each other and in parallel to the priority traffic manager and the performance traffic manager;
        based on the status of the traffic manager, the backup status of the backup traffic manager, the priority level of the at least one end point, and the performance level of the at least one end point, causing a computer operation associated with the request to be executed against an incident data structure managed by a producer, wherein the computer operation is intended to be executed via the traffic manager based on the priority level and the performance level of an end point of the traffic manager, wherein the backup traffic manager is configured to:
            (1) perform, based on the priority level and the performance level of an end point of the backup traffic manager, a portion of the computer operation for the traffic manager when the status of the traffic manager indicates the traffic manager is unavailable; and
            (2) perform, based on the priority level and the performance level of the end point of the backup traffic manager, the portion of the computer operation when the backup status of the backup traffic manager indicates the backup traffic manager is available;
        based on executing the computer operation, receiving a response from the producer; and
        based on the response from the producer, generating a Really Simple Syndication (RSS) feed indicative of the incident-related information associated with the client.

2. The redundant computerized system of claim 1, wherein the portion of the computer operation associated with the request is processed by:
    at least one of: the priority traffic manager or the backup priority traffic manager; and
    at least one of: the performance traffic manager or the backup performance traffic manager.

3. The redundant computerized system of claim 1, wherein a primary content delivery network (CDN) communicatively couples the priority traffic manager, the backup priority traffic manager, the performance traffic manager, and the backup performance traffic manager, and
    wherein a secondary CDN communicatively couples the backup priority traffic manager to (1) a backup storage device storing extended markup language (XML) pushed to the backup storage device or (2) a regional service storing XML pulled by the regional service.

4. The redundant computerized system of claim 1, wherein the traffic manager executing the portion of the computer operation comprises: routing the request to an application-level gateway (ALG), via a content delivery network (CDN), to receive, via a regional service, the response from the producer.

5. The redundant computerized system of claim 1, wherein the backup traffic manager executing the portion of the computer operation comprises at least one of:
routing the request to an ALG, via a CDN, to receive, via a regional service, the response from the producer; or
route the request to a backup storage device, to receive the response from the producer.

6. The redundant computerized system of claim 1, wherein the response from the producer is received, via a regional instance, based on a pull operation for product catalog data or active incident data, or
wherein the response from the producer is received, via the regional instance, based on a static push operation for the product catalog data or the active incident data.

7. The redundant computerized system of claim 1, wherein the operations further comprise:
receiving a second request for incident-related information associated with a second client;
determining at least one of: the priority level or the performance level of at least one end point corresponding to a respective downstream device to process the second request; and
based on the status, the backup status, and the at least one of: the priority level or the performance level of the at least one end point associated with the second request, causing a computer operation associated with the second request to be executed against a second incident data structure.

8. The redundant computerized system of claim 1, wherein determining the priority level or the performance level of the at least one end point corresponding to the respective downstream device to process the request comprises:
determining that the end point having a highest priority level or the end point having a highest performance level comprises the traffic manager, wherein the portion of the computer operation is executed by the traffic manager based on the traffic manager being the end point having the highest priority level or being the end point having the highest performance level.

9. A computer-implemented method to deliver incident-related information despite outages associated with components configured to deliver the incident-related information, the computer-implemented method, comprising:
accessing, via a redundant incident management system, a request for the incident-related information associated with a client;
determining at least one of: a priority level or performance level of at least one end point corresponding to a respective downstream device to process the request;
determining a first, second, third, and fourth status of a priority traffic manager configured to process the request based on the priority level, a backup priority traffic manager, a performance traffic manager configured to process the request based on the performance level, and a backup performance traffic manager, respectively, wherein the backup priority traffic manager serves as a backup to the priority traffic manager and is configured to process the request based on the priority level, wherein the backup performance traffic manager serves as a backup to the performance traffic manager and is configured to process the request based on the performance level, wherein the backup priority traffic manager and the backup performance traffic manager are communicatively coupled in series to each other and in parallel to the priority traffic manager and the performance traffic manager, and wherein the priority traffic manager and the performance traffic manager are communicatively coupled in series and separate from each other;
based on the priority level of the at least one end point and the performance level of the at least one end point, and based on at least one of: the first status, the second status, the third status, or the fourth status, causing a computer operation associated with the request to be executed on an incident data structure managed by a producer, wherein the computer operation is intended to be executed based on the priority level and the performance level of an end point of the performance traffic manager or the priority traffic manager and via at least one of: the performance traffic manager or the priority traffic manager, wherein the backup performance traffic manager or the backup priority traffic manager is configured to:
(1) perform at least a portion of the computer operation for the performance traffic manager or the priority traffic manager and based on the priority level and the performance level of an end point of the backup priority traffic manager or the backup performance traffic manager and when the first status or the third status indicates the performance traffic manager or the priority traffic manager is unavailable, and
(2) perform at least the portion of the computer operation based on the priority level and the performance level of the end point of the backup priority traffic manager or the backup performance traffic manager and when the second status or the fourth status indicates the backup performance traffic manager or the backup priority traffic manager is available;
based on executing the computer operation, receiving a response from the producer; and
based on the response from the producer, generating an information feed indicative of the incident-related information associated with the client.

10. The computer-implemented method of claim 9, wherein at least the portion of the computer operation is executed by the backup priority traffic manager irrespective of the priority level in response to the first status indicating that the priority traffic manager is unresponsive.

11. The computer-implemented method of claim 9, wherein at least the portion of the computer operation is processed by:
at least one of: the priority traffic manager or the backup priority traffic manager; and
at least one of: the performance traffic manager or the backup performance traffic manager.

12. The computer-implemented method of claim 9, wherein the information feed comprises a Really Simple Syndication (RSS) feed generated based on extended markup language (XML) received as part of the response received from the producer.

13. The computer-implemented method of claim 9, wherein a primary content delivery network (CDN) communicatively couples the priority traffic manager, the backup priority traffic manager, the performance traffic manager, and the backup performance traffic manager; and
wherein a secondary CDN communicatively couples the backup priority traffic manager to (1) a backup storage device storing extended markup language (XML) pushed to the backup storage device or (2) a regional service storing XML pulled by the regional service.

14. One or more computer-storage media having computer-executable instructions embodied thereon that, when executed by a redundant computing system having at least one processor and at least one memory, cause the redundant computing system to:
- access a request for incident-related information associated with a client;
- determine at least one of: a priority level or performance level of least one end point corresponding to a respective downstream device to process the request;
- determine a first, second, third, and fourth status of a priority traffic manager configured to process the request based on the priority level, a backup priority traffic manager, a performance traffic manager configured to process the request based on the performance level, and a backup performance traffic manager, respectively, wherein the backup priority traffic manager serves as a backup to the priority traffic manager and is configured to process the request based on the priority level, wherein the backup performance traffic manager serves as a backup to the performance traffic manager and is configured to process the request based on the performance level, wherein the backup priority traffic manager and the backup performance traffic manager are communicatively coupled in series to each other and in parallel to the priority traffic manager and the performance traffic manager, and wherein the priority traffic manager and the performance traffic manager are communicatively coupled in series and separate from each other;
- based on at least one of the first status, the second status, the third status, or the fourth status, and based on the priority level of the at least one end point and the performance level of the at least one end point, execute a computer operation associated with the request on an incident data structure managed by a producer, wherein the computer operation is intended to be executed via at least one of: the performance traffic manager or the priority traffic manager based on the priority level and the performance level of an end point of the performance traffic manager or the priority traffic manager, wherein the backup performance traffic manager or the backup priority traffic manager is configured to:
  (1) perform at least a portion of the computer operation for the performance traffic manager or the priority traffic manager based on the priority level and the performance level of an end point of the backup priority traffic manager or the backup performance traffic manager and when the first status or the third status indicates the performance traffic manager or the priority traffic manager is unavailable, and
  (2) perform at least the portion of the computer operation based on the priority level and the performance level of the end point of the backup priority traffic manager or the backup performance traffic manager and when the second status or the fourth status indicates the backup performance traffic manager or the backup priority traffic manager is available;
- based on executing the computer operation, receive a response from the producer; and
- based on the response from the producer, generate a Really Simple Syndication (RSS) feed indicative of the incident-related information associated with the client.

15. The one or more computer-storage media of claim 14, wherein at least the portion of the computer operation is executed by the backup priority traffic manager irrespective of the priority level in response to the first status indicating that the priority traffic manager is unresponsive.

16. The one or more computer-storage media of claim 14, wherein at least the portion of the computer operation is processed by:
- at least one of: the priority traffic manager or the backup priority traffic manager; and
- at least one of: the performance traffic manager or the backup performance traffic manager.

17. The one or more computer-storage media of claim 14, wherein a primary content delivery network (CDN) communicatively couples the priority traffic manager, the backup priority traffic manager, the performance traffic manager, and the backup performance traffic manager.

18. The computerized system of claim 1, wherein the performance level comprises performance information indicative of a level of impact, and wherein the priority level comprises priority information indicative of a level of importance.

19. The computer-implemented method of claim 9, wherein the performance level comprises performance information indicative of a level of impact, and wherein the priority level comprises priority information indicative of a level of importance.

20. The one or more computer-storage media of claim 14, wherein the performance level comprises performance information indicative of a level of impact, and wherein the priority level comprises priority information indicative of a level of importance.

* * * * *